United States Patent
Hamaguchi et al.

(10) Patent No.: US 7,474,493 B2
(45) Date of Patent: Jan. 6, 2009

(54) ALTERNATIVE DC-BURST SERVO PATTERN FOR PERPENDICULAR RECORDING

(75) Inventors: Takehiko Hamaguchi, Odawara (JP); Hideaki Maeda, Odawara (JP); Kazuhisa Shishida, Odawara (JP); Yasutaka Nishida, Kodaira (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 421 days.

(21) Appl. No.: 10/701,593

(22) Filed: Nov. 6, 2003

(65) Prior Publication Data

US 2004/0252394 A1 Dec. 16, 2004

(30) Foreign Application Priority Data

Jun. 13, 2003 (JP) ............................ 2003-169261

(51) Int. Cl.
*G11B 5/596* (2006.01)

(52) U.S. Cl. ................... 360/77.08; 360/48; 360/60; 360/75

(58) Field of Classification Search .............. 360/48, 360/53, 77.087, 77.02, 77.06, 75, 125–126, 360/77.08

See application file for complete search history.

(56) References Cited

U.S. PATENT DOCUMENTS

| | | | |
|---|---|---|---|
| 4,578,723 A | | 3/1986 | Betts et al. |
| 4,912,585 A | * | 3/1990 | Belser et al. ............... 360/135 |
| 5,459,679 A | * | 10/1995 | Ziperovich .................. 708/3 |
| 5,786,957 A | * | 7/1998 | Inoue et al. ............. 360/77.08 |
| 6,025,971 A | * | 2/2000 | Inoue et al. ............. 360/77.08 |
| 6,084,731 A | * | 7/2000 | Uchida et al. ............... 360/48 |
| 6,181,492 B1 | * | 1/2001 | Bonyhard ................... 360/17 |
| 6,212,023 B1 | * | 4/2001 | Bonyhard ................... 360/15 |
| 6,249,396 B1 | * | 6/2001 | Gray ......................... 360/55 |
| 6,262,859 B1 | * | 7/2001 | Cho ....................... 360/77.08 |
| 6,366,423 B1 | * | 4/2002 | Ahn ....................... 360/77.08 |
| 6,885,514 B1 | * | 4/2005 | Codilian et al. .............. 360/31 |
| 7,035,026 B2 | * | 4/2006 | Codilian et al. .............. 360/31 |
| 7,075,743 B2 | * | 7/2006 | Nishida et al. .............. 360/48 |
| 7,230,790 B1 | * | 6/2007 | Mallary et al. ........... 360/77.08 |

(Continued)

FOREIGN PATENT DOCUMENTS

EP 0 097 208 6/1982

(Continued)

OTHER PUBLICATIONS

U.S. Appl. No. 10/231,264, Nishida et al., filed Aug. 30, 2002.

(Continued)

*Primary Examiner*—Hoa T Nguyen
*Assistant Examiner*—Dismery Mercedes
(74) *Attorney, Agent, or Firm*—Reed Smith LLP; Stanley P. Fisher, Esq.; Juan Carlos A. Marquez, Esq.

(57) ABSTRACT

The invention provides a servo pattern that is stable for long time, easily writable, and excellent in S/N. DC-signal area included in a burst area of a servo pattern comprises combination of positive and negative DC-signals, low-density dummy bit, or pattern having phases that are deviated each other so that the sum of magnetization of the burst area of the servo pattern is equalized to 0.

3 Claims, 25 Drawing Sheets

U.S. PATENT DOCUMENTS

2002/0034031 A1    3/2002   Sakai
2002/0057509 A1*   5/2002   Nishida et al. ................. 360/48
2003/0021056 A1*   1/2003   Shimomura .................. 360/75

FOREIGN PATENT DOCUMENTS

| EP | 1 205 911 A2 | 8/2001 |
|---|---|---|
| HU | 9902253 | 10/1999 |
| JP | 2002-100134 | 9/2000 |
| JP | 2002-230734 | 1/2001 |
| WO | WO 97/41553 | 5/1997 |

OTHER PUBLICATIONS

International Search Report and Written Opinion for Singapore Application No. 200306598-4 dated Sep. 24, 2007.

* cited by examiner

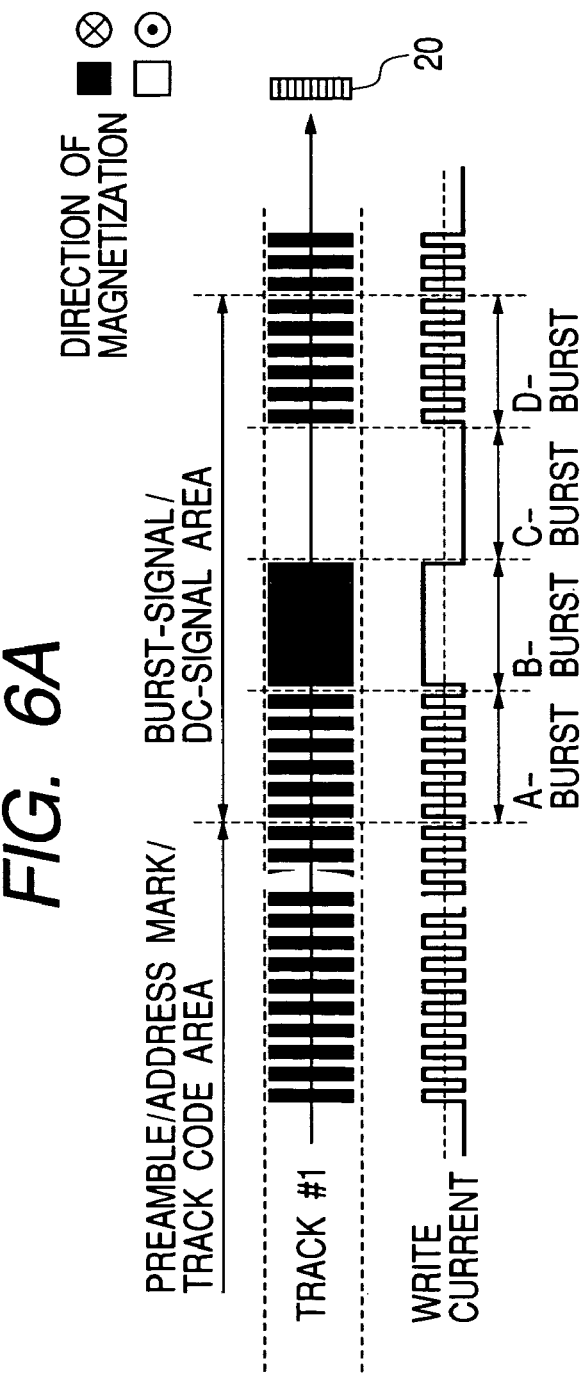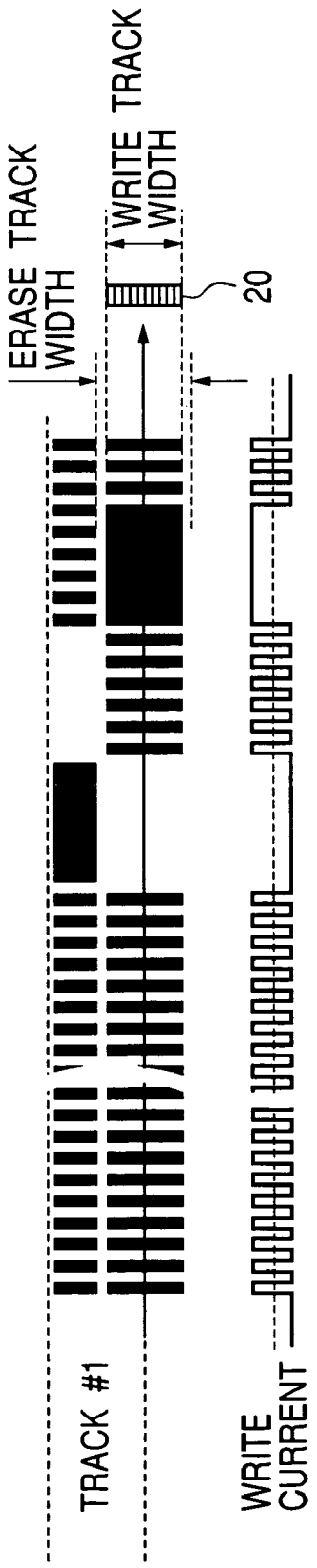

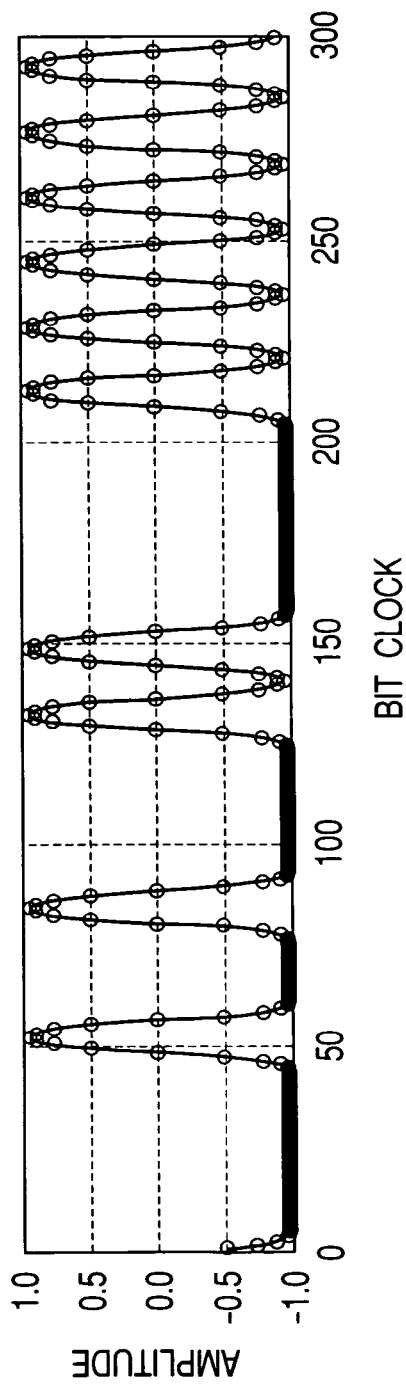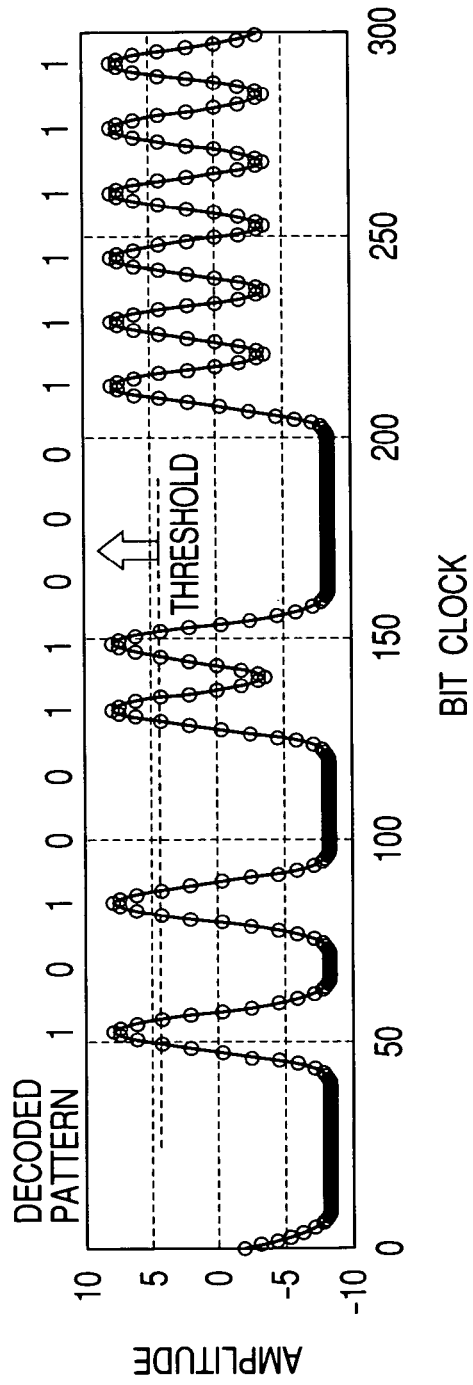

ALTERNATIVE DC-BURST SERVO PATTERN FOR PERPENDICULAR RECORDING

BACKGROUND OF THE INVENTION

1. Field of the Invention

This invention relates to a magnetic disk apparatus for recording the information, and particularly relates to a magnetic disk apparatus that uses a perpendicular magnetic recording medium that holds the data by means of the magnetic information of the direction perpendicular to the layer surface.

2. Description of Related Art

In the conventional disk apparatus, a magnetic head is moved in the radial direction with respect to a rotating magnetic disk so that the magnetic head is positioned accurately at a target data track, and the information is written and read magnetically. A magnetic disk has a servo area for positioning a magnetic head to a track. One example of a servo pattern recorded on a servo area is shown in FIG. 18. A read element of a magnetic head reads a servo pattern from left to right relatively in FIG. 18 with rotation of a disk. The servo pattern has a track code area on which the track number information for obtaining approximate head position signal on the entire disk surface and a burst area for obtaining accurate position information on each inside track. The burst area comprises a pair of A-burst and B-burst and a pair of C-burst and D-burst repeating alternately with the track width. The pair of A-burst and B-burst is disposed with deviation of a half of a track width from the pair of C-burst and D-burst. This structure is similar to the technique disclosed in JP-A No. 222468/1983, and this technique is applied to magnetic disk apparatus popularly. Furthermore, the servo pattern has a continuous pattern called as preamble area to reduce the effect of magnetic characteristic and floating of a disk. Furthermore, the servo pattern has an address mark area to detect timing of end of the preamble area and timing of start of the track code area and following pattern.

FIG. 19A is a read waveform obtained at the position of the read element shown in FIG. 18. For simplification, read waveform of the address mark area and track code area is omitted. Burst amplitudes of A-burst to D-burst are normalized by use of amplitude of preamble, and the amplitude difference between A-burst and B-burst shows N-position signal. Similarly the amplitude difference between C-burst and D-burst shows Q-position signal. FIG. 19B shows the change of N-position signal and Q-position signal. As shown in FIG. 19B, N-position signal is equal to 0 at the position where the read element extends over A-burst and B-burst equally, and N-position signal varies approximately in proportion to the deviation from the position. The servo circuit controls a rotary actuator 13 with targeting the position where N-position signal is adjusted to 0 so that the center of a track is traced.

Patent Literature 1: JP-A No. 222468/1983
Patent Literature 2: JP-A No. 230734/2002
Patent Literature 3: JP-A No. 150729/2002

It is required to develop high memory capacity magnetic disk apparatus that a small bit is formed on a magnetic disk with smaller magnetization pattern. Furthermore, it is required that the formed small bit remains stable for a long time. The perpendicular magnetic recording system is a recording system that uses a perpendicular disk comprising a laminate of a recording layer having an easy axis and a soft layer perpendicularly, and this system is advantageous in that stronger magnetic filed can be generated in comparison with the conventional system because the soft layer concentrates the magnetic field of a magnetic head. The generated strong recording magnetic field allows us to use a recording layer with high coercivity, and the recording layer with high coercivity allows a small bit to be maintained stable. Furthermore, the perpendicular magnetic recording system is advantageous in that smaller bit reduces demagnetization due to adjacent bits and is stable, and the smaller magnetization pattern can be formed easily the more.

FIG. 20 shows reduction of amplitude with elapsed time of a magnetization pattern recorded by means of the perpendicular magnetization recording system. Herein, the recording density shows exemplary respective recording densities of 10 kFCI, 90 kFCI, and 120 kFCI. In the perpendicular magnetic recording system, the lower recording density reduces the amplitude the more as shown in FIG. 20. A-burst of a servo area is disposed so as to be surrounded by a DC-erasing area, and therefore includes a low recording density corresponding to 10kFCI shown in FIG. 20. Hence, the amplitude of the servo pattern decreases with elapsed time in the case that the conventional servo pattern described with reference to FIG. 18 is applied to the perpendicular magnetic recording system. The servo area cannot be restored by rewriting after shipment because a special sequence is required for recording the servo area.

Furthermore, only the magnetization transition portion generates leak magnetic field in the conventional in-plane magnetic recording system, on the other hand the magnetization pattern itself generates leak magnetic field in the perpendicular magnetic recording system. In other words the DC-signal component generates leak magnetic field extraordinarily, the extraordinary leak magnetic field induces bias field on the entire magnetic head to thereby shift the bias point of a read element and write element. As the result the performance becomes poor. To avoid this disadvantage, a technique that high density pattern is written before a servo pattern is recorded to reduce the effect of DC-signal is proposed in JP-A No. 230734/2002. According to this technique the effect of DC-signal can be reduced, but the effect is effective for only a partial area covering approximately 10 to 30%, namely the residual area obtained by subtracting the width of a write element from a track pitch, in the servo write process.

FIG. 21 shows relation between recording density and overwrite in the perpendicular magnetic recording system. The lower the recording density is, the poorer the overwrite is. It is seen that the low recording density is formed in difficulty. If the conventional servo pattern described with reference to FIG. 18 is applied to the perpendicular magnetic recording system, the magnetic head is deficient in write performance and deficient for saturation recording, and noise component of a disk increases to deteriorate the positioning accuracy. "Servo pattern of first example" and "servo pattern of second example" shown in FIG. 20 will be described hereinafter.

As described hereinabove, combination of the conventional servo pattern and perpendicular magnetic recording system cannot prevent reduction of amplitude with elapsed time in the low recording density situation, generation of extraordinary bias field due to DC-signal component, and deficient write of DC-signal component. As the result, only the magnetic disk apparatus with low reliability is provided.

To solve the problem, it is required that the servo pattern does not include low recording density component. JP-A No. 150729/2002 proposes a servo pattern having a built-in dummy bit with high recording density on the DC-erasing area as shown in FIG. 22. According to this technique the component of frequency included in a servo pattern is increased, and the stability of a recording pattern and overwrite are improved. However, the noise generated from high recording density magnetization is superimposed on the read signal of a servo pattern to cause deterioration of the positioning accuracy. A servo pattern having a dummy bit frequency of double fundamental frequency is recorded, and the track code detection performance is measured. The result is shown in FIG. 23. The deterioration of error rate of track code due to component caused from magnetization of the dummy bit is more serious on the inner radius on which the recording density is higher.

To solve the above-mentioned problem, development of a new technique to realize a magnetic disk apparatus having a tremendous memory capacity of perpendicular magnetic recording system and having an easy-writable and excellent S/N servo pattern of stable long life has been desired.

SUMMARY OF THE INVENTION

The present invention has been accomplished to solve the above-mentioned problem and provides a servo pattern that is suitable for the perpendicular magnetic recording system. In detail, DC-signal area included in the servo pattern comprises combination of positive DC-signal and negative DC-signal, and the sum of magnetization of the DC-signal area is equalized to 0. Herein, the sum of magnetization of one DC-signal area in which positive DC-signal and negative DC-signal are both included may be equalized to 0, or otherwise the sum of magnetization of a plurality of DC-signal areas may be equalized to 0 wherein one DC-signal area comprises any one of positive DC-signal and negative DC-signal. Furthermore, compensational signal may be used so as to equalize the sum of magnetization to 0.

According to another embodiment of the present invention, DC-signal area included in a servo pattern comprises a burst-signal having a deviated phase so that the sum of magnetization of the burst area of the servo pattern is equalized to 0. Herein, the output of the bust area is detected by means of Fourier transfer by setting phase deviation to 90 degrees or 180 degrees.

According to another embodiment, DC-signal area included in a servo pattern comprises embedded low density dummy bit so that the sum of magnetization of DC-signal area is equalized to 0. Herein, the recording density of the dummy bit is preferably set to ⅔, ½, or ⅓ the recording density of a preamble signal area.

Furthermore, the address mark area and track code area of the servo pattern is encoded with recording density of ½ to 1 the recording density of the bust signal. Herein, phase shift encoding system or di-phase encoding system may be employed as the encoding system of the address mark area and track code area so that the sum of magnetization of the entire servo pattern is equalized to 0.

The bias field induces jitter noise due to non-linear transition shift or easy/difficult shift when a servo pattern is written. Furthermore, the bias field deviates the bias point of a read element when a servo pattern is read, and thereby induces amplitude asymmetry error of read waveform. The present invention provides a servo pattern that is correct in timing and easy to read, and realizes a high-capacity magnetic disk apparatus with high track density.

Furthermore, according to the present invention, the lowest recording density of servo pattern may be improved and the overwrite performance can be improved while the highest recording density is maintained at the same density level as that of the conventional servo pattern. The present invention provides a servo pattern that is easy in saturation recording and excellent in S/N, and realizes a high-capacity magnetic disk apparatus with high track density.

Furthermore, deterioration of residual magnetization with elapsed time can be suppressed by increasing the lowest recording density of a servo pattern. The present invention provides a servo pattern that is excellent in S/N even after elapse of long time at high temperature, and realizes a magnetic disk apparatus that is reliable for long time.

According to the present invention, the sum of magnetization of the entire servo pattern can be equalized to 0. The servo pattern of the present invention is recorded on a perpendicular magnetic recording type magnetic disk to thereby suppress DC-signal component that induces extraordinary bias field on a magnetic head. As the result, deterioration of performance due to bias field is prevented.

BRIEF DESCRIPTION OF THE DRAWING

Preferred embodiments of the present invention will be described in detail based on the followings, wherein:

FIGS. 6A to 6E are diagrams describing a method for writing the servo pattern of the present invention;

FIGS. 9A and 9B are diagrams describing a method for decoding the track code from the read waveform of the servo pattern of the present invention;

DETAILED DESCRIPTION OF THE PREFERRED EMBODIMENTS

Embodiments of the present invention will be described in detail hereinafter with reference to the drawings. At first, an exemplary structure of a magnetic disk and magnetic disk apparatus that are common to embodiments described hereinafter will be described.

Figure 1:
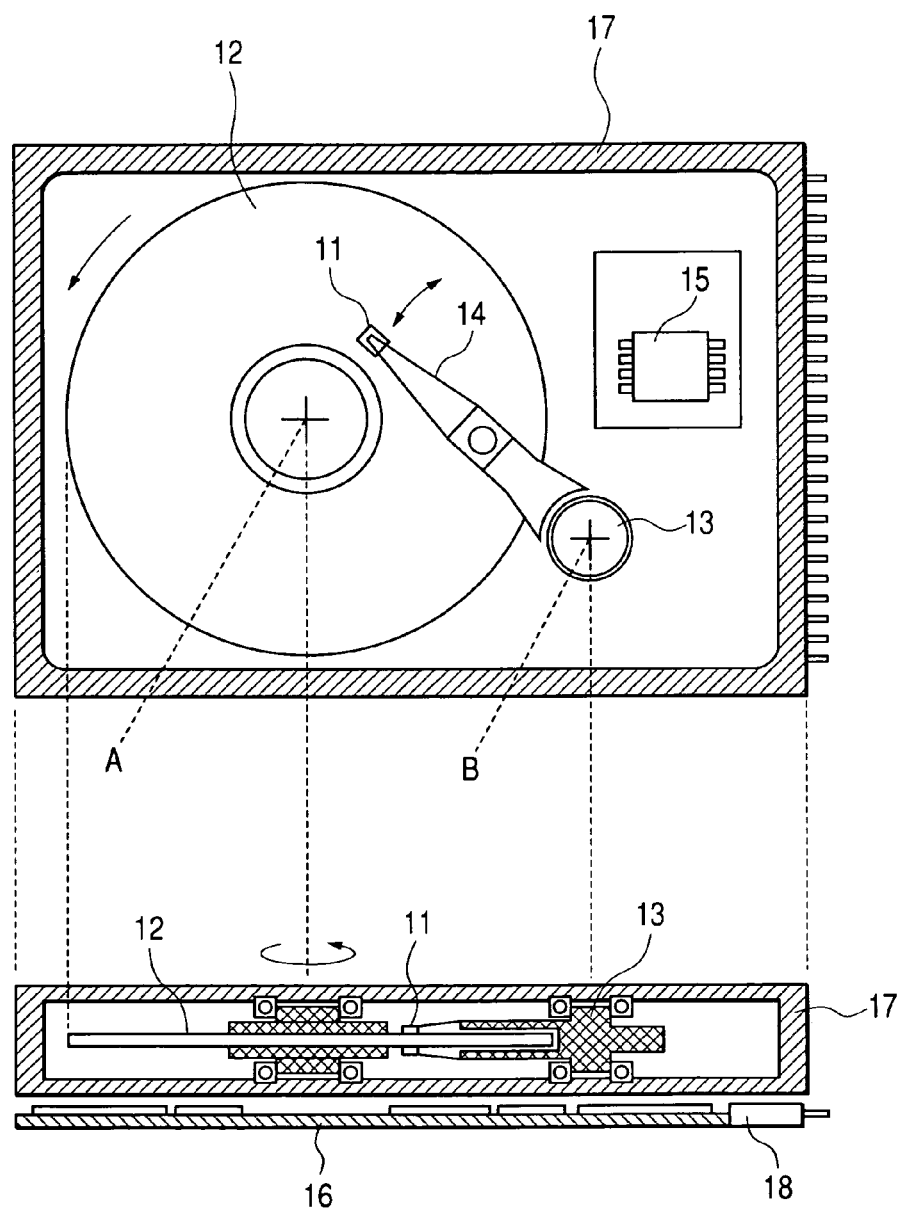
FIG. 1 is a diagram describing the structure of a magnetic disk apparatus.

FIG. 1 is a schematic structural diagram of a perpendicular magnetic recording type magnetic disk apparatus that the present invention addresses. A magnetic disk 12 is fixed to a motor that rotates round the point A, and the motor rotates the magnetic disk at a rotation speed of 3000 to 15000 rpm. The magnetic disk 12 has a perpendicular magnetic recording layer, and is a double layer medium having a soft under layer preferably. A magnetic head 11 is fixed to a rotary actuator that rotates round the point B with interposition of a suspension 14, and reciprocated in the radius direction of the magnetic disk 12 by means of the rotary actuator 13. Such rotary actuator is used for almost all magnetic disk apparatus that are shipped recent years because the rotary actuator is suitable for miniaturization of the structure. Parts including the above-mentioned parts and write/read amplifier 15 are contained in the internal of a box 17 for protection from dusty and moist external environment. The write/read amplifier 15 is an electric circuit for electrical transfer between the magnetic head 11 and a package board 16. LSI such as a signal processing circuit and data connector 18 for connection to an external host machine are mounted on the package board 16.

Figure 2:
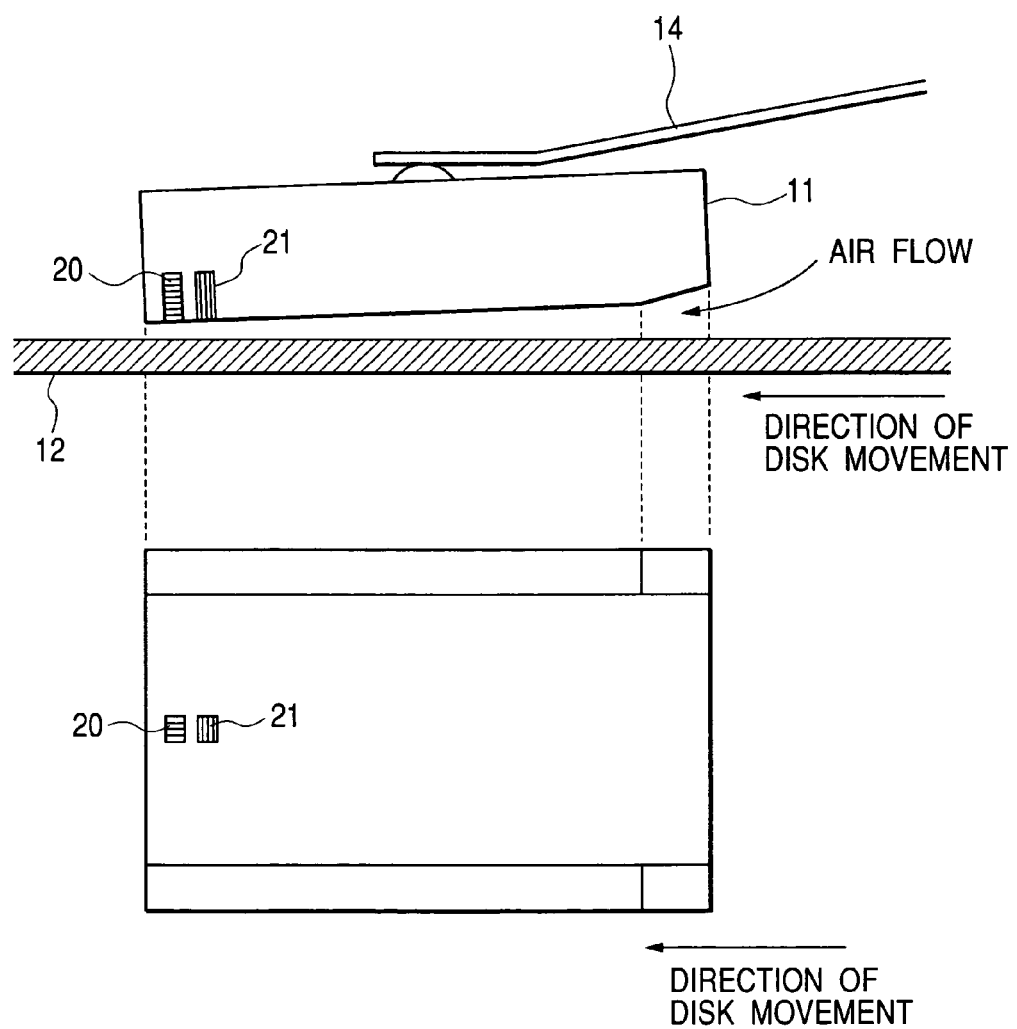
FIG. 2 is a diagram describing the structure of a magnetic head and relative relation between the magnetic head and a magnetic disk.

The structure of the magnetic head 11 is described with reference to FIG. 2. A write element 20 for forming a magnetization pattern on the magnetic disk 12 and a read element 21 for transforming the magnetization information that leaks from a magnetization pattern of the magnetic disk 12 to an electric signal are mounted on the magnetic head 11. The write element 20 comprises a coil and magnetic pole, and generates a write magnetic field to write on the magnetic disk 12 when a write current signal flows through the coil. The write element 20 is preferably a write element of the single pole head structure provided with a main pole and a return pole. Furthermore, the read element 21 comprises a magneto-resistive sensor to which magneto-resistive effect is applied, and the resistance change of the sensor is detected to thereby read the magnetization information of the magnetic disk 12. The magnetic head 11 is floating on the magnetic disk 12 with interposition of a very narrow space with aid of an air pressure film arising from air flow caused by the rotating magnetic disk 12.

Figure 3:
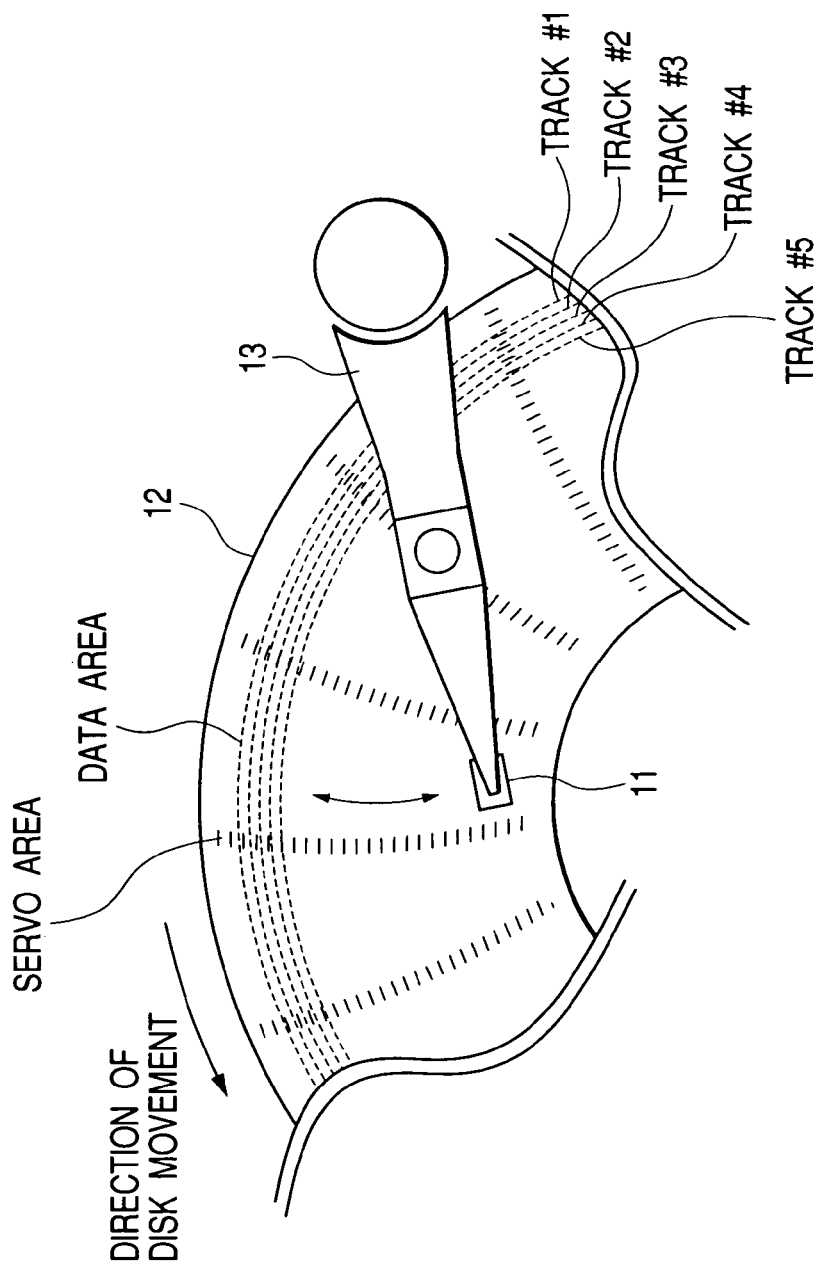
FIG. 3 is an enlarged diagram of a portion of the magnetic disk.

FIG. 3 is an enlarged partial view of the magnetic disk for describing the layout of servo area and data area. The area on which many tracks of concentric circle or spiral formed on the magnetic disk is the data area, and the area on which areas formed radially crossing the data area is the servo area. The track width is extremely enlarged for description and only five tracks are shown in FIG. 3, but more than 100,000 tracks are formed at intervals of about several tens to several 100 nm actually on a magnetic disk of a magnetic disk apparatus. The data area and servo area are formed magnetically and cannot be optically discriminated directly. The magnetic head 11 can be moved to arbitrary radial position on the magnetic disk 12 by the rotary actuator 13, but must be in tracking operation (following) with respect to a specific track position when the data is written or read. To track a specific track, it is required that the relative position information of the magnetic head 11 and magnetic disk 12 should be always measured correctly, and the effect of rotational vibration of the motor and rotary actuator and the effect of positional deviation due to thermal expansion of the mechanical system should be reduced. The relative position information of the magnetic head and magnetic disk is called as head position signal, and the servo area is provided to obtain the head position signal. It is required that layout of the servo area and the pattern written on the servo area are designed so that the head position signal is obtained as correctly as possible to improve the track density of a magnetic disk apparatus.

Figure 4:
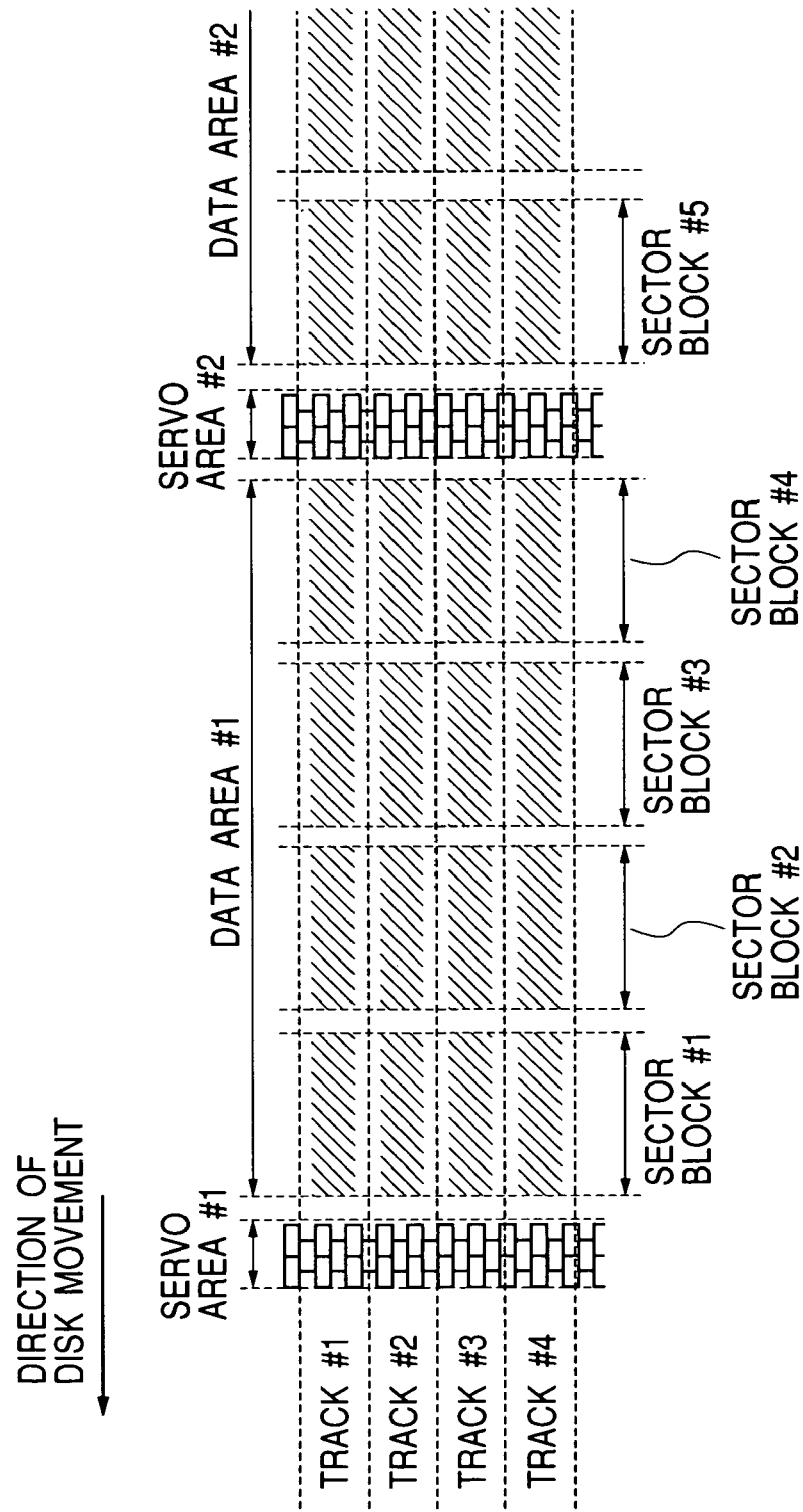
FIG. 4 is a diagram describing the layout of the servo area and data area.

FIG. 4 shows the layout of the servo area and data area. The servo area and data area are disposed alternately along the direction of disk movement at about equal intervals, and 100 to several hundreds servo areas are disposed on one circle of a disk. One data area (#1) is divided into a plurality of tracks, and one track is divided into a plurality of sector blocks (#1 to #4). One sector block is a minimum unit for data writing and reading, and has a size of 512 byte to several thousands byte data and additional several tens byte management information. The data area is rewritten very often by a user, but on the other hand the servo area is written by a maker in a manufacturing plant before shipment of the product and will not be rewritten by a user. The servo area is isolated from the data area with gap area provided to absorb the distance between the write element 20 and read element 21 and the change of movement speed. FIG. 4 is a diagram of tracks enlarged in the direction of track width.

Next, an embodiment of the present invention will be described.

Embodiment 1

Figure 5:
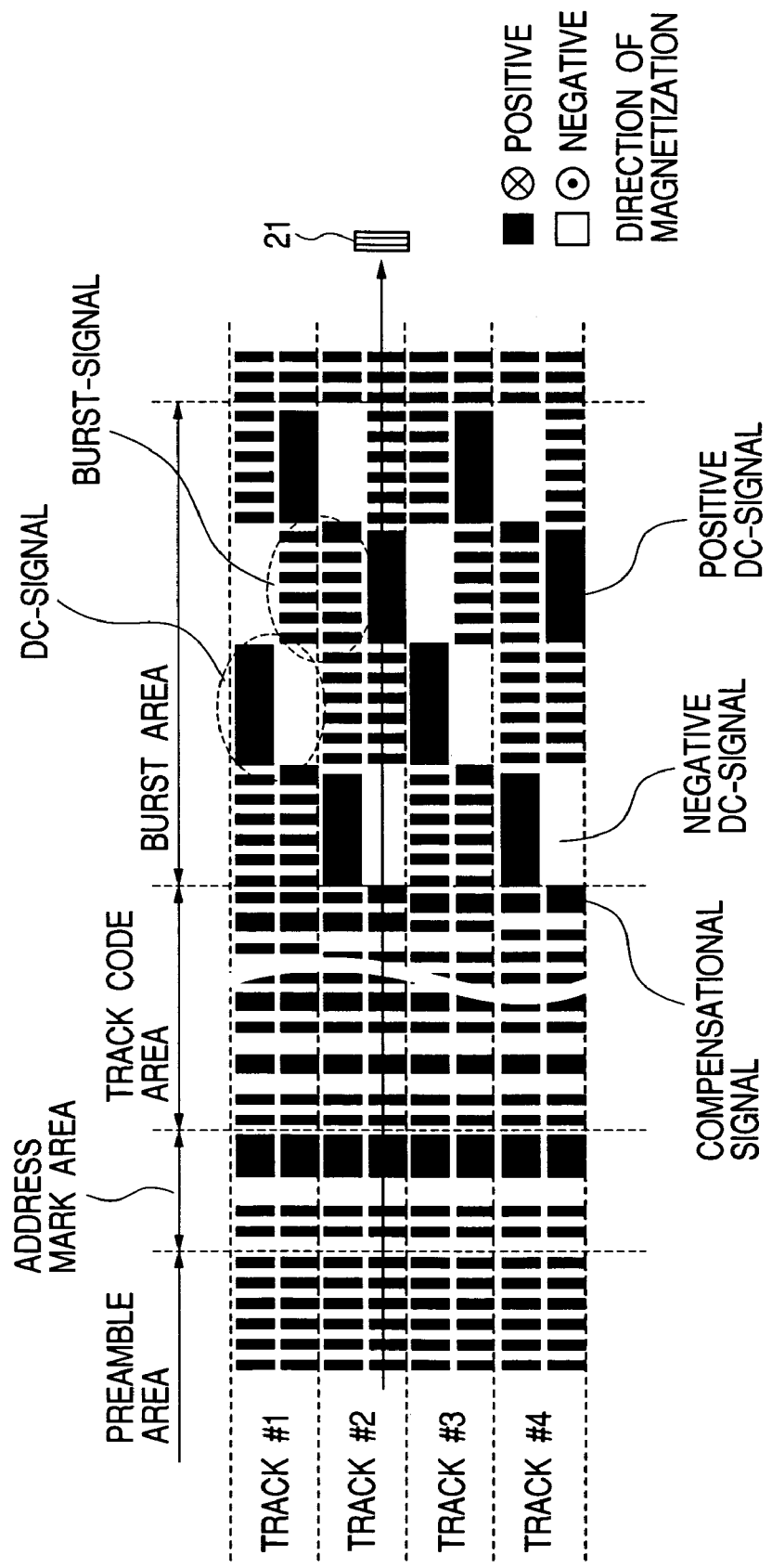
FIG. 5 is a diagram describing an exemplary servo pattern in accordance with the present invention.

FIG. 5 is a diagram describing an exemplary servo pattern of a magnetic disk apparatus of the present invention. The left-right direction on FIG. 5 is the direction of disk movement, and the up-down direction on FIG. 5 is the disk radius direction. A magnetic head is fixed to a rotary actuator, and a magnetic disk moves from right to left in FIG. 5 at a speed of 5 to 50 m/s. The situation is relatively same as that the magnetic head moves from left to right on the disk in FIG. 5. For easy understanding the expression that the magnetic head moves on the disk is employed in the following description.

FIG. 5 shows four tracks from track #1 to track #4 in detail that are servo areas shown in FIG. 3 and FIG. 4. FIG. 5 is a diagram enlarged more in up-down direction than in left-right direction in comparison with an actual magnetic disk apparatus. The burst area is described in the present embodiment, and the address mark area and track code area will be described in the embodiment 6.

The servo pattern of the magnetic disk apparatus of the present invention is characterized by the structure of DC-signal area. All the DC-signal areas of the conventional servo pattern shown in FIG. 18 comprise DC-signals magnetized in the same direction, and as the result the sum of magnetization is a large value in any one of directions. On the other hand, one DC-signal area of the servo pattern of the present embodiment comprises a plurality of DC-signals having positive and negative direction of magnetization that are inverse each other. In the exemplary servo pattern shown in FIG. 5, one DC-signal area comprises DC-signals having positive and negative direction of magnetization of the same area. Furthermore, to equalize the sum of the magnetization to 0 perfectly, one compensational signal for compensation of the magnetization is provided on each track. The sum of magnetization may be equalized to 0 by adjusting the position of rising-up edge or falling-down edge of DC-signals without using the compensational magnetization; however, the timing management is complex when the servo pattern is formed in this case.

Figure 6C:
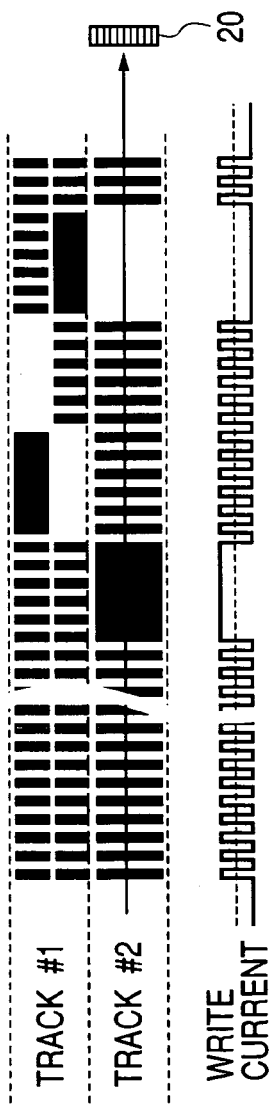
Figure 6D:
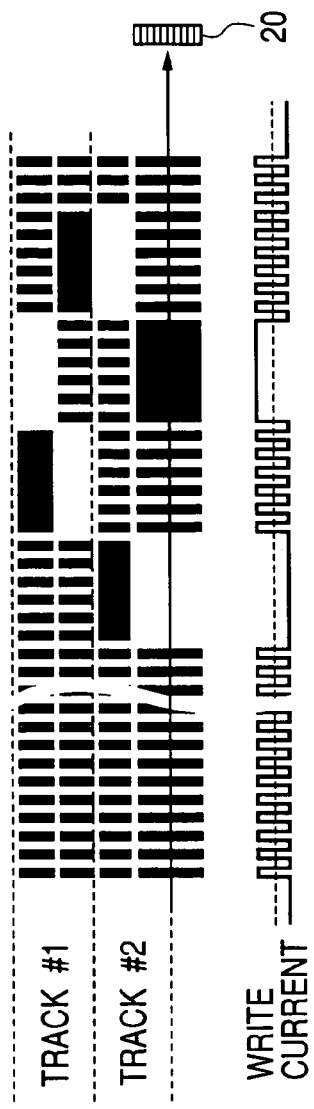
Figure 6E:
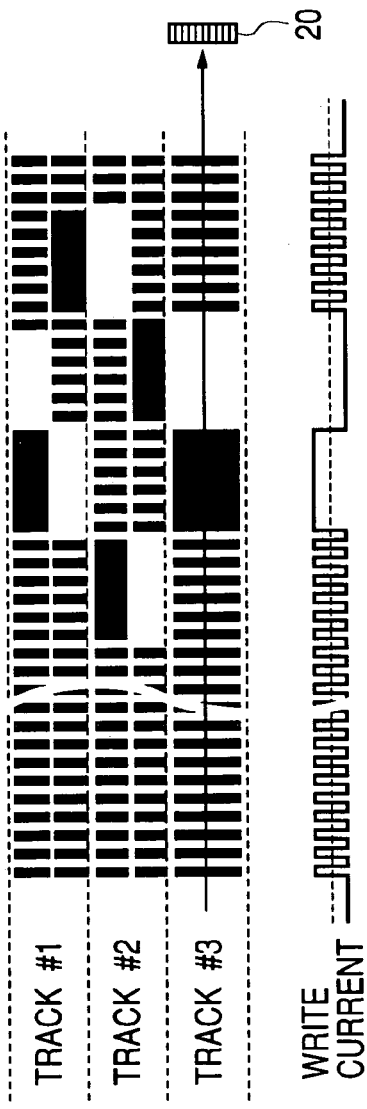

A technique for actually forming the servo pattern of the present embodiment is described with reference to FIG. 6. A write current is supplied to a write element to form the pattern shown in FIG. 6A. Furthermore, a write current shown in FIG. 6B is supplied with positional deviation of the write element by a distance of ½ track width to thereby complete a pattern that is the same pattern in track #1 of A-burst and B-burst and a pattern that switches at the position of a half track width of C-burst and D-burst. The reason why a space is formed at the center of the track #1 is that the magnetic head having an erasing width wider than a write width is used popularly, and the size of the space and existence of the space depend on the characteristic of individual magnetic heads. The write currents shown in FIG. 6C to FIG. 6E are supplied successively with successive deviation of the write element by distance of ½ track width each to complete the servo pattern of the present embodiment shown in FIG. 5. At that time, a clock that synchronizes with disk rotation may be generated from a clock head disclosed in JP-A No. 48286/1989 to manage the timing of write current, or otherwise writing may be carried out while the timing is being generated from the read waveform of the read element itself without using a clock head.

Figure 7:
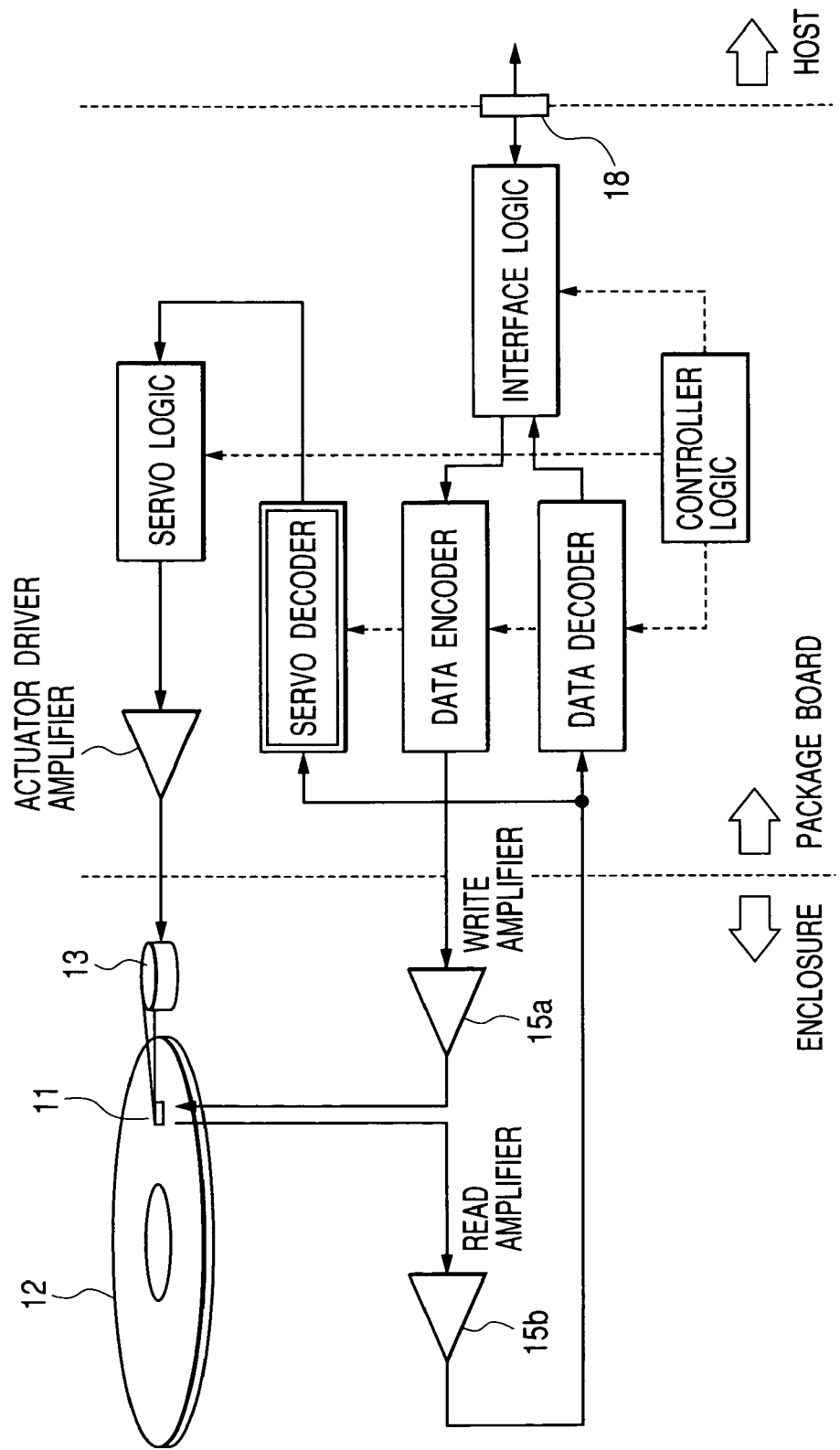
FIG. 7 is a block diagram describing the functional structure of a magnetic disk apparatus of the present invention.

Furthermore, the operation and function of components of the magnetic disk apparatus of the present embodiment are described with reference to a block diagram shown in FIG. 7. When the data is written, an interface circuit receives the data from a data connector 18 connected to a host, and the data is converted to serial write signal through a data encoder, converted to write current signal through a write amplifier 15*a*, and then converted to write field through the magnetic head 11. The write field is written in a magnetic disk 12. The magnetic head 11 converts leak field generated from the magnetic disk 12 to electric read signal when the data is read out. The read signal is converted to the original digital data through the read amplifier 15*b* and data decoder, and then supplied to the host through an interface circuit. The servo decoder detects the correct head position signal from the servo pattern of the magnetic disk 12 in parallel with data write and read operation. The servo circuit compares the head position signal with the target position to calculate a suitable current value to be supplied to the rotary actuator 13, and operates predetermined operations such as following and seek. A control circuit functions to control flow and timing of these processing as a whole.

Figure 8:
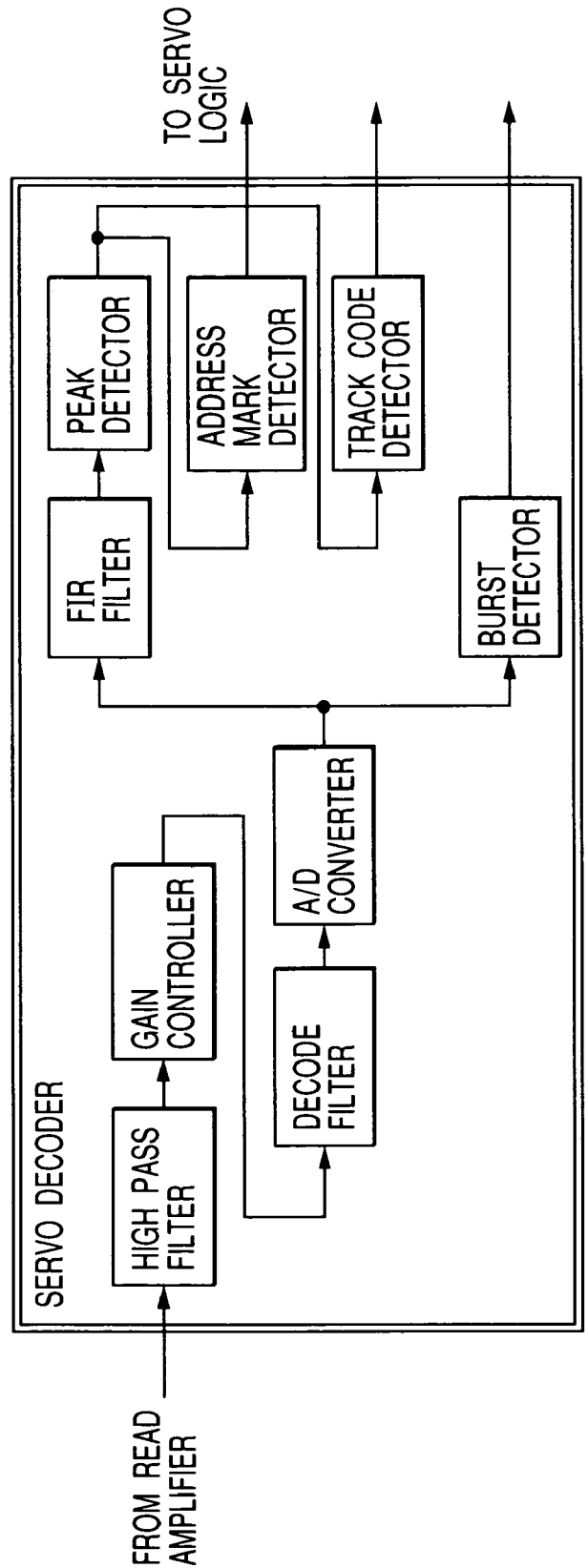
FIG. 8 is a block diagram describing the structure of a servo decoder of the present invention.

Next, operation of the servo decoder is described with reference to FIG. 8. A gain controller is turned on at the timing when the magnetic head starts reading of the preamble area, the gain of the gain controller is fixed at the time point when the address mark area is detected, and signals of the track code area and burst area are normalized with the preamble amplitude. A decode filter is a band-pass filter that allows the write frequency of the track code area and burst area to pass selectively. A peak detector decodes the track code after the read waveform of the track code area passes through a decode filter, A/D converter, and FIR filter.

The read waveform supplied to the servo decoder and the read waveform that has passed through the FIR filter are shown in FIG. 9A and FIG. 9B respectively. FIG. 9A shows the read waveform of the servo pattern that is supplied to the servo decoder, and FIG. 9B shows the read waveform that has passed through the FIR filter. The peak detector distinguishes 1 and 0 based on the detection slice level, the address mark detector judges coincidence with the address mark pattern, and the track code detector decodes the servo pattern of the track code area. The burst detector decodes the amplitude of the burst area after the read waveform of the burst area passes through the decode filter and A/D converter. The burst detector detects the amplitude of A-burst to D-burst by means of integration and Fourier transfer of the value obtained just after A/D conversion.

The structure of the servo pattern of the present embodiment described hereinabove equalizes the sum of magnetization of the entire burst area including the DC-signal area and burst area approximately to 0, and as the result the performance deterioration due to bias field arising from DC-signal is prevented. Particularly, non-linear transition shift and easy/difficult shift are suppressed in writing, and the servo pattern with correct timing and less jitter noise can be formed. Furthermore, bias point of the read element is maintained correctly in reading, and the read waveform with less amplitude asymmetry error can be obtained. By applying the servo pattern of the present embodiment, a magnetic disk apparatus with higher track density is realized without any special device and processing for forming servo pattern.

Embodiment 2

Figure 10:
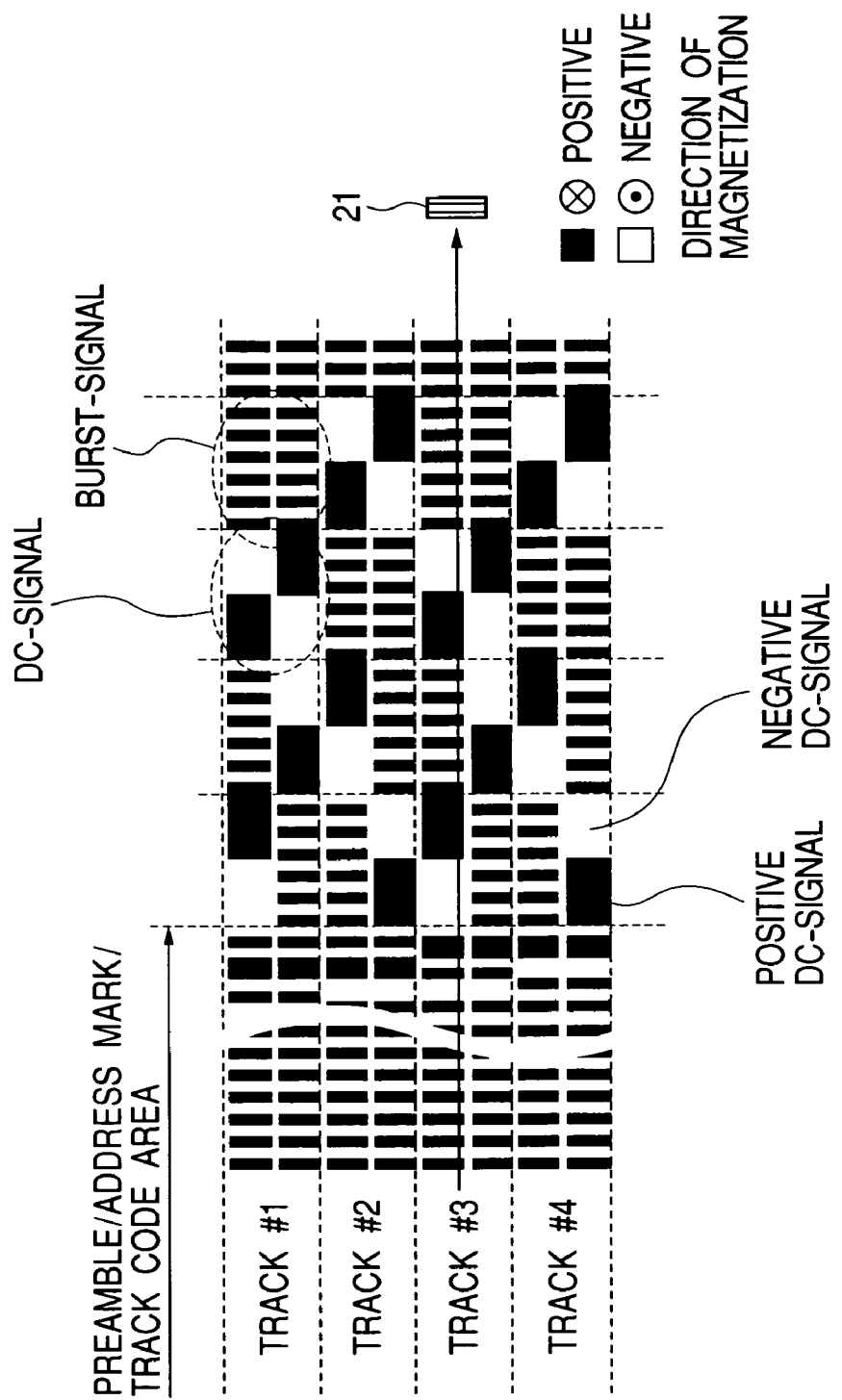
FIG. 10 is a diagram describing an exemplary servo pattern of the present invention having DC-erasing areas each one of witch comprises two positive magnetization directions and two negative magnetization directions.

FIG. 10 is a schematic diagram showing another embodiment of a servo pattern in accordance with the present invention. The servo pattern of the present embodiment has the structure in which one DC-signal area comprises two positive magnetization DC-signals and two negative magnetization DC-signals and the four DC-signals have the same areas. As the result, the sum of the magnetization of the DC-signal areas is almost 0. This servo pattern structure is more advantageous than embodiment 1 in that the area of DC-signals is minimized to mitigate the effect of the bias field the more and the sum of magnetization can be equalized to 0 without using the compensational magnetization.

The servo pattern of the present embodiment is formed by means of the same process as used in the embodiment 1. Furthermore, the servo pattern of the present embodiment can decode the head position signal by use of the servo decoder shown in FIG. 8. By applying the servo pattern of the present embodiment, the performance deterioration due to bias field arising from DC-signal in writing and reading is prevented, and as the result a magnetic disk apparatus with high track density and high capacity is realized.

Embodiment 3

Figure 11:
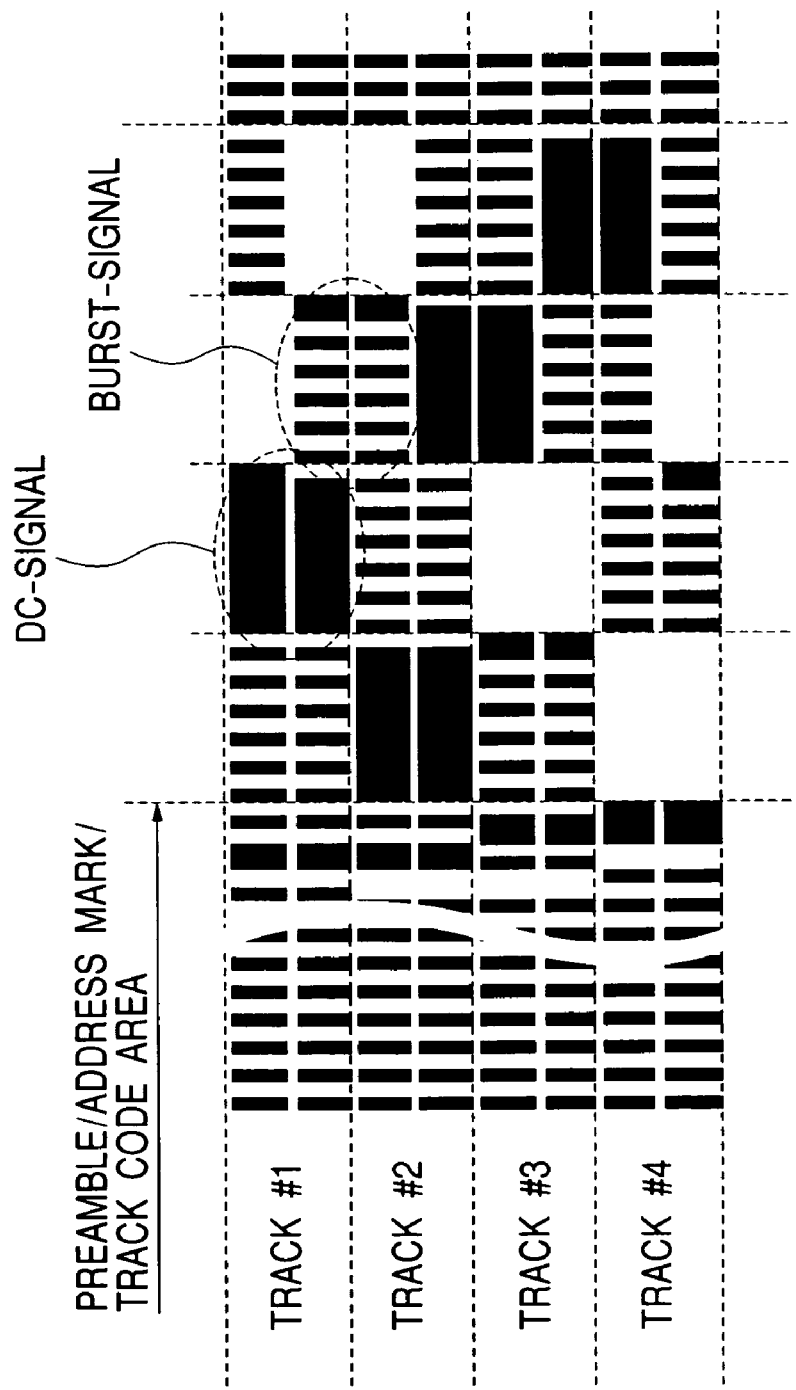
FIG. 11 is a diagram describing exemplary servo pattern of the present invention having DC-erasing areas each one of which comprises one magnetization direction.

FIG. 11 is a schematic diagram showing another embodiment of the servo pattern in accordance with the present invention. One DC-signal area of the servo pattern of the present invention comprises one DC-signal. Narrow spaces disposed at ½ track intervals, which are caused from the difference between erasing width and write width of a magnetic head when the servo pattern is formed, are not essential for the present embodiment.

Figure 18:
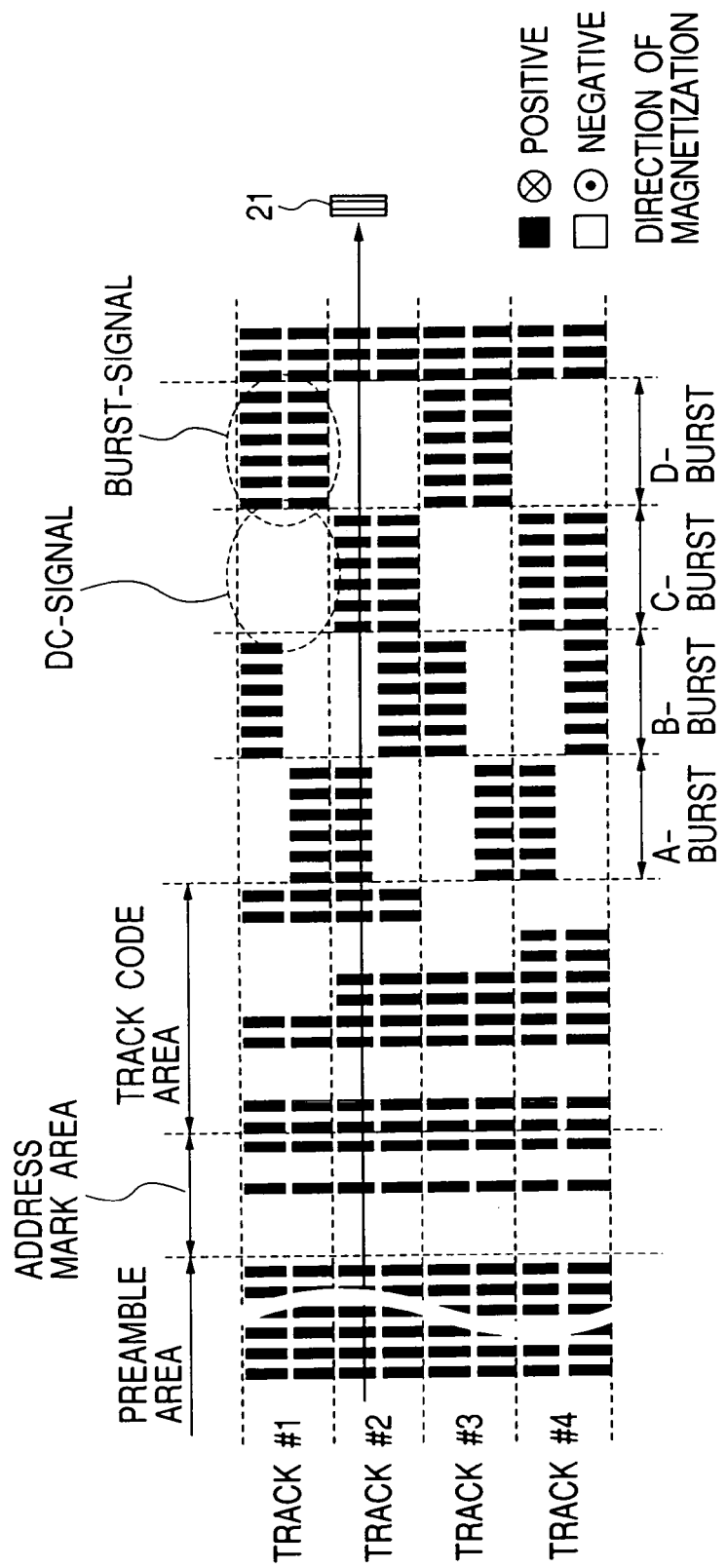
FIG. 18 is a diagram describing an exemplary servo pattern of a conventional magnetic disk apparatus.
Figure 19A:
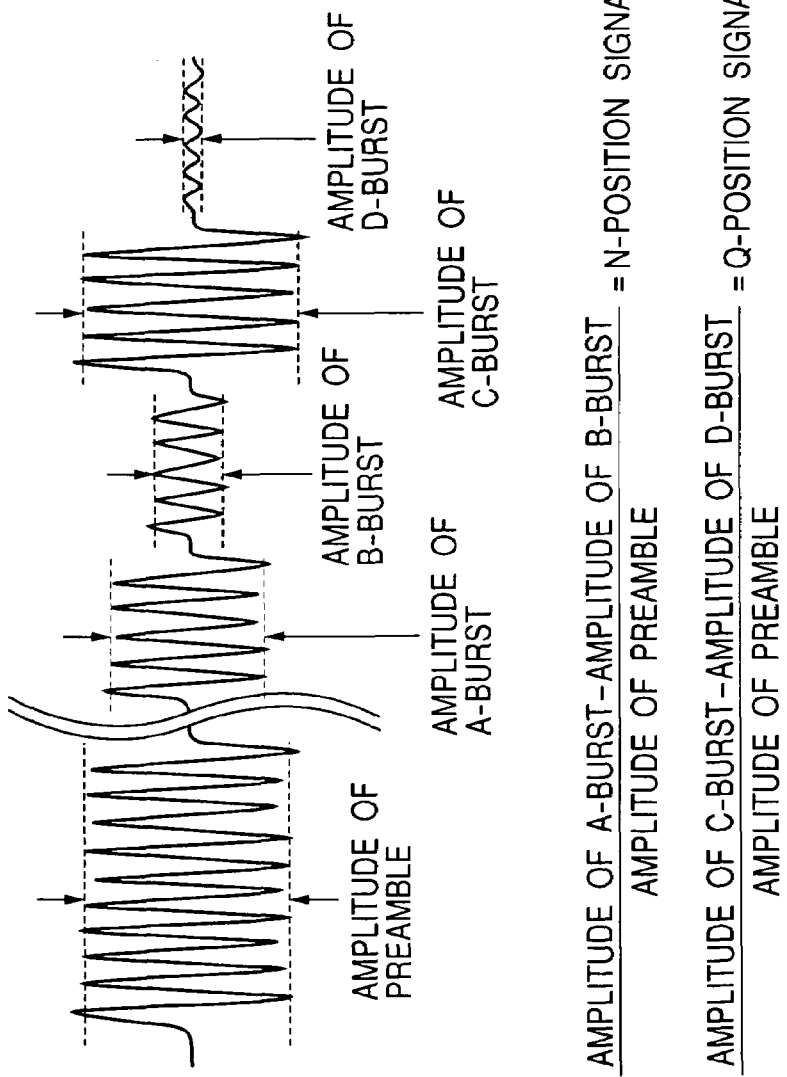
FIGS. 19A and 19B are diagrams describing a method for decoding the position signal from the read waveform of a servo pattern.
Figure 19B:
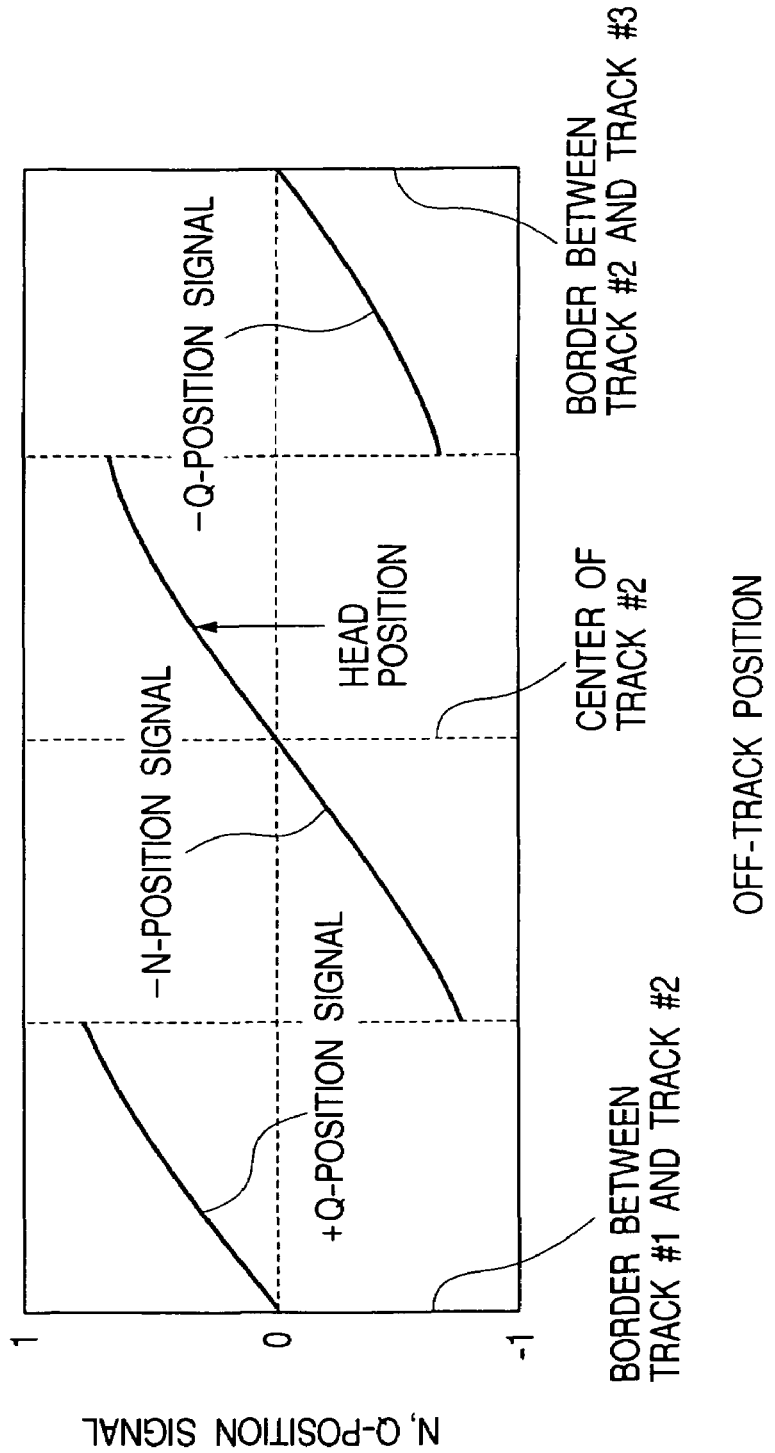

One DC-signal area of the conventional servo pattern shown in FIG. 18 also comprises one DC-signal, however, on the other hand the pattern of the present embodiment has two DC-signals of positive and negative magnetization direction that are adjacent in the disk radius direction with interposition of the burst-signal area, and the sum of magnetization of a plurality of DC-signal areas is almost 0. The area of each DC-signal of this structure is larger than that of embodiment 1 and the effect to mitigate the influence of bias field is poorer than that of embodiment 1, however, the servo pattern of the present embodiment is advantageous in that unnecessary bias field is not applied on the read element because of no magnetization reversal in one DC-signal area.

Figure 12:
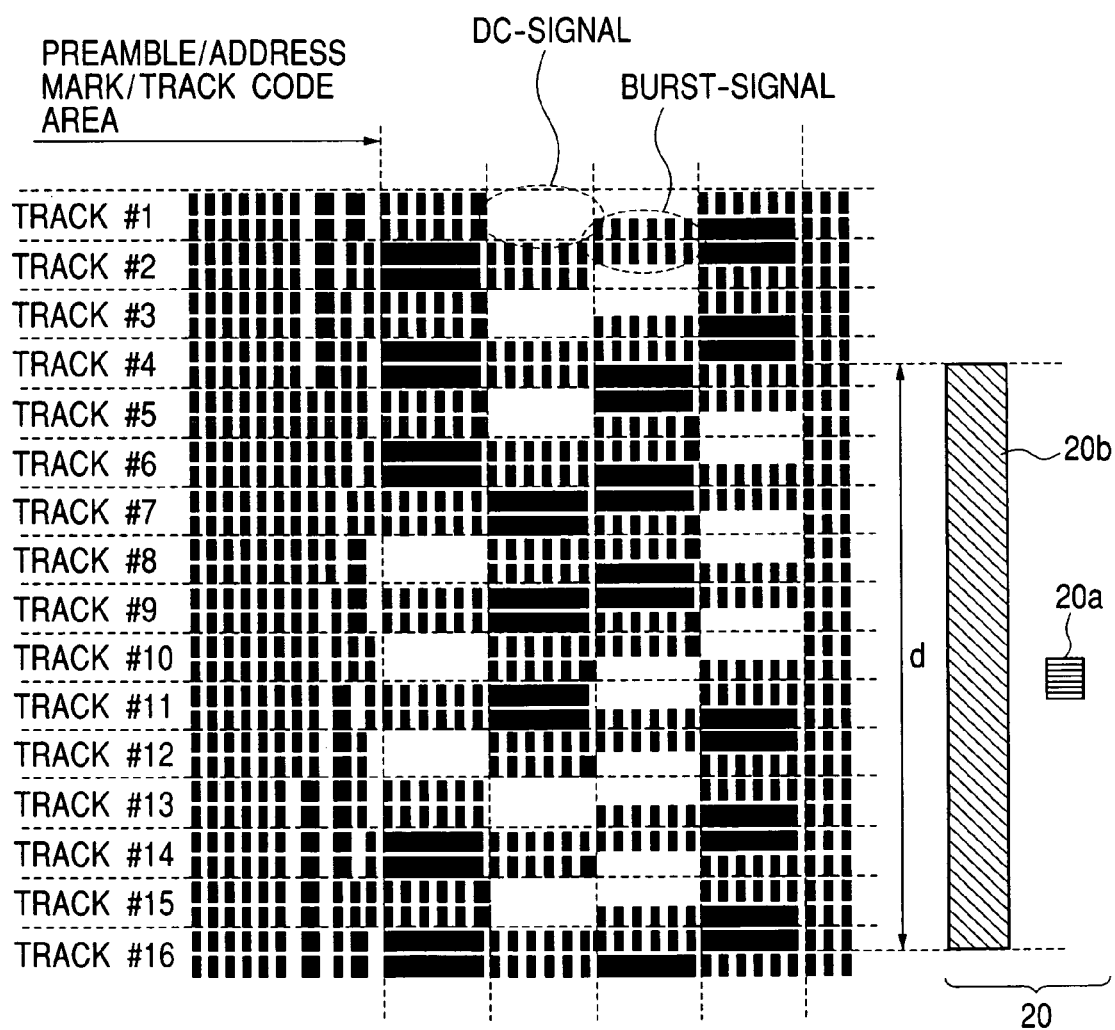
FIG. 12 is a diagram describing the relation between the servo pattern of the present invention and the return pole width of the magnetic head.

Magnetization of DC-signal areas may be reversed at larger periods, for example, period of 4 tracks or 6 tracks in the disk radius direction. For example, FIG. 12 shows an example in which magnetization of DC-signal areas is reversed at 6 track periods, and the sum of magnetization of 12 tracks is almost 0. The larger the reversal period is, the larger the bias field becomes. To solve the problem, it is required to equalize the sum of magnetization of the area in the range equivalent to the return pole of the single magnetic pole write element having the main pole 20$a$ and return pole 20$b$ approximately to 0. In this case, the 6 track period at which magnetization of DC-signal areas reversed, that is equivalent to half of the width d of the return pole, namely a half of 12 tracks, is the upper limit. The servo pattern with infinite reversal period is equivalent to the conventional servo pattern shown in FIG. 18.

The servo pattern of the present embodiment is formed in the same manner as used in the embodiment 1. Furthermore, the servo pattern of the present embodiment can decode the head position signal by use of the servo decoder shown in FIG. 8. By applying the servo pattern of the present embodiment, the performance deterioration due to bias field arising from DC-signal in writing and reading is prevented, and as the result a magnetic disk apparatus with high track density and large capacity is realized.

Embodiment 4

Figure 13:
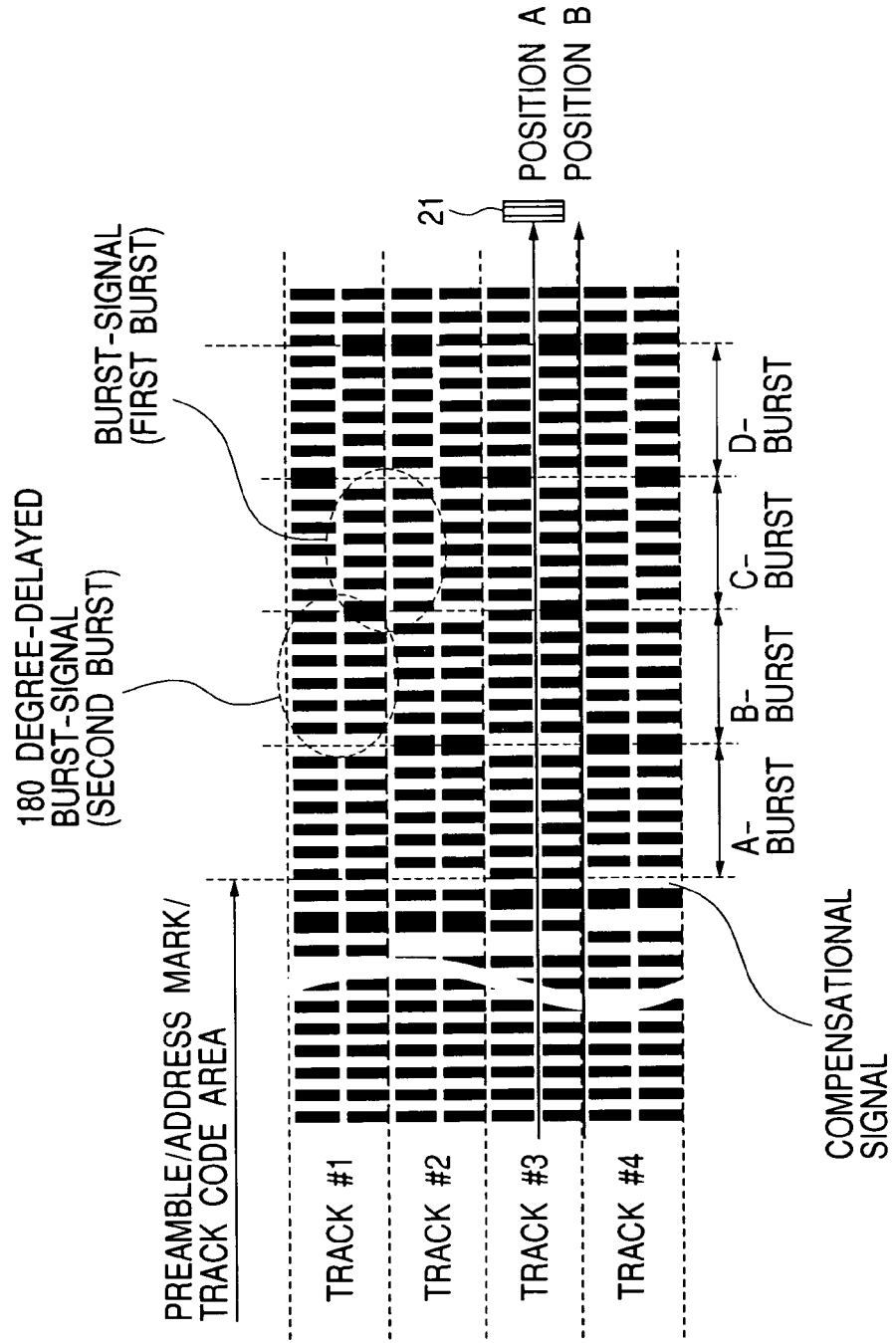
FIG. 13 is a diagram describing an exemplary servo pattern of the present invention comprising the first burst area and second burst area having phase components that are different 180 degrees each other.

FIG. 13 is a schematic diagram showing another embodiment of a servo pattern in accordance with the present invention. In the present embodiment, a first burst-signal area that is equivalent to a burst-signal area of the conventional servo pattern shown in FIG. 18 and a second burst-signal area that is equivalent to a DC-signal area of the convention servo pattern are formed. The first burst-signal area and the second burst area are repeat signals that are same in frequency but different in phase. An exemplary servo pattern shown in FIG. 13 comprises the first burst-signal area having a phase that is the same as that of the preamble area and the second burst-signal area having a phase that is delayed 180 degrees from the first burst-signal area.

The servo pattern of the present embodiment is formed in the same manner as used in the embodiment 1. Furthermore, the servo decode circuit shown in FIG. 8 may be used. However, a method for controlling a magnetic head to decoded head position signal is different. For example, the amplitude of C-burst and D-burst is almost 0 for the read waveform at the position A, and the amplitude of A-burst and B-burst is almost 0 for the read waveform at the position B. The position of the rotary actuator 13 is controlled so that the amplitude of C-burst and D-burst is equalized approximately to 0 to follow the center of track #3.

Figure 14:
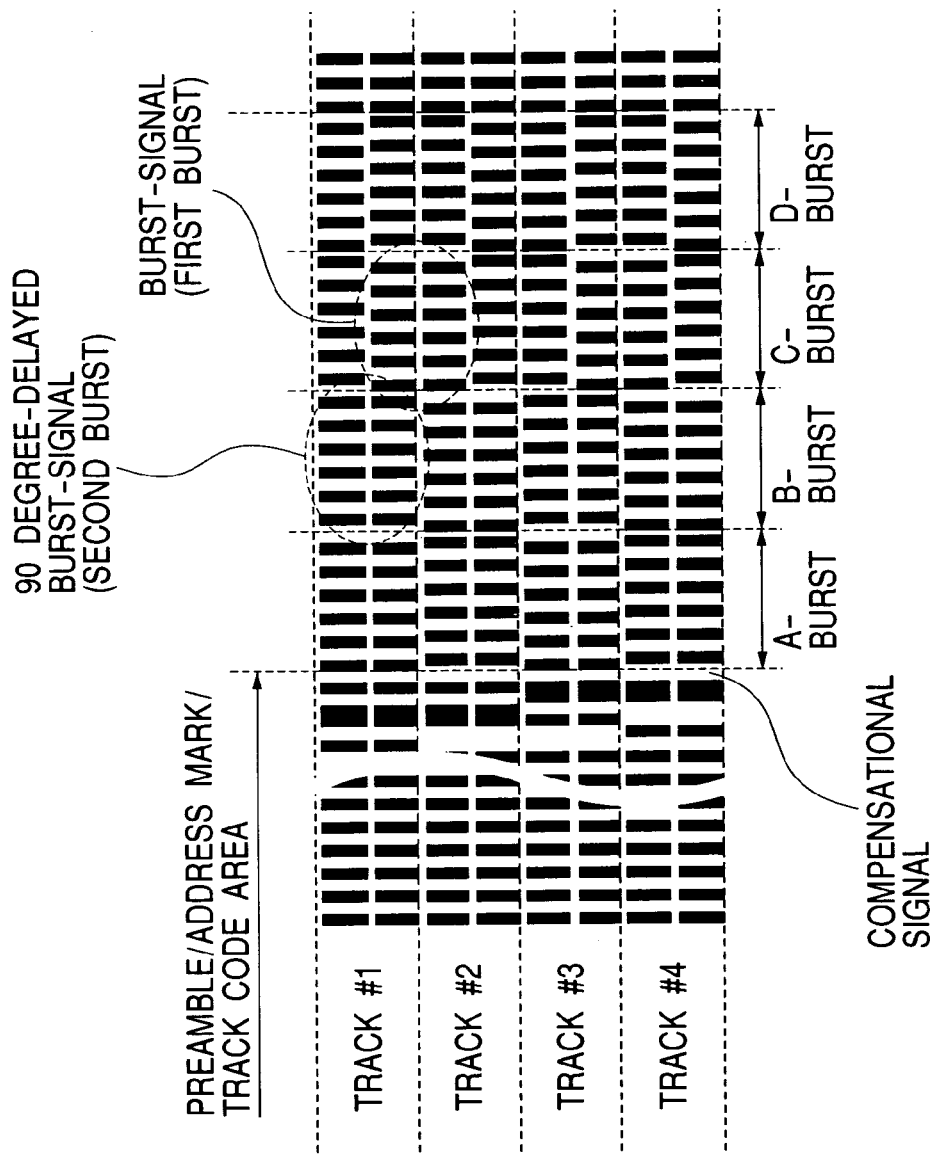
FIG. 14 is a diagram describing an exemplary servo pattern of the present invention comprising the first burst area and second burst area having phase components that are different 90 degrees each other.

Furthermore, the phase of the first burst-signal area may be equalized to that of the preamble area and the phase of the second burst-signal area is delayed by 90 degrees from that of the first burst-signal area by adjusting the length of the area that is designated as the compensational signal. An exemplary servo pattern is shown in FIG. 14. The servo pattern shown in FIG. 14 can be also formed in the same manner as used in the embedment 1. At that time, the synchronous clock may be oscillated with four-times the frequency to write on the 90 degree-delayed second burst-signal area. Furthermore, a clock having a phase that delays 90 degrees from the delay line and double synchronous clock may be generated in parallel, and the clock is switched when the second burst-signal area is written. The burst detector of the servo decoder shown in FIG. 8 functions to separate the first and second burst-signal area. In detail, a read waveform generated from the A/D converter is subjected to Fourier transfer and the read waveform is separated into a component of the first burst-signal area as a sine component and a component of the second burst-signal area as a cosine component. The technique of burst detection by means of Fourier transfer is employed conventionally, it is sufficient for realizing the present embodiment to add only the fiction for outputting the sine component and cosine component.

By applying any of servo patterns described hereinabove, the performance deterioration due to bias field arising from DC-signal in writing and reading is prevented, and as the result a magnetic disk apparatus with high track density and large capacity is realized.

Embodiment 5

Figure 15:
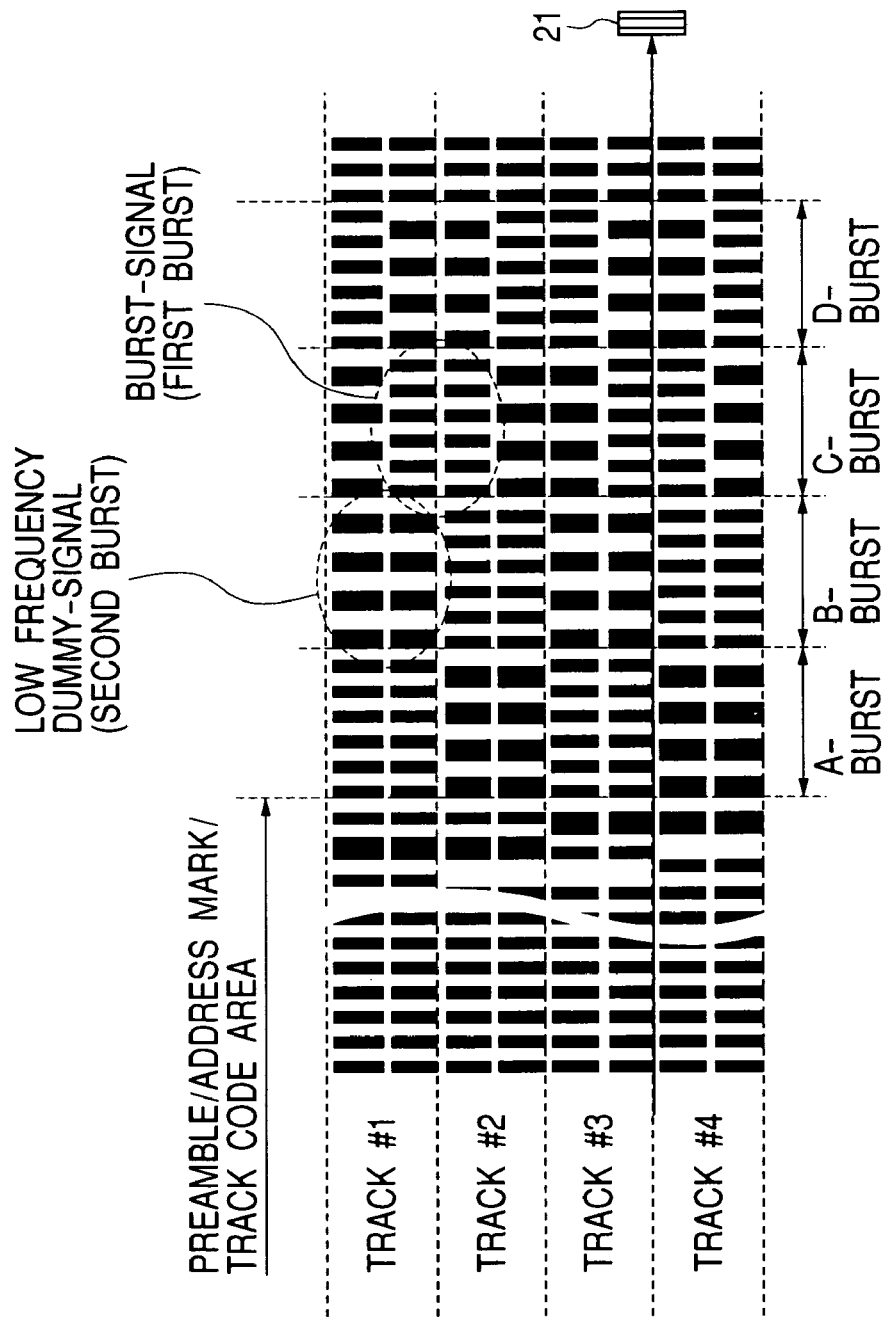
FIG. 15 is a diagram describing an exemplary servo pattern of the present invention comprising the first burst area and second-burst area that has ⅔ the frequency of the first burst area.

FIG. 15 is a schematic diagram showing another exemplary servo pattern in accordance with the present invention. In the present embodiment, a first burst-signal area that is equivalent to a burst-signal area of a conventional servo pattern shown in FIG. 18 and the second burst-signal area that is equivalent to DC-signal area of the conventional servo pattern are formed. The frequency of the second burst-signal area is set at ⅔ the frequency of the first burst-signal area. The servo pattern of the present invention is also formed in the same manner as used in the embodiment 1. At that time, the synchronous clock may be oscillated with 6 times the frequency for writing. A clock having ⅔ the frequency may be generated in parallel and the clock is switched for writing on the second burst-signal area.

Figure 16A:
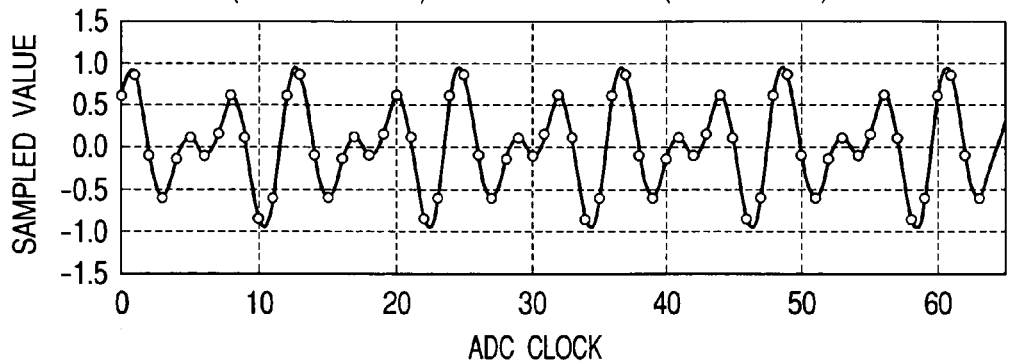
FIGS. 16A to 16C are diagrams describing the read waveform of the burst area of the servo pattern of the present invention.
Figure 16B:
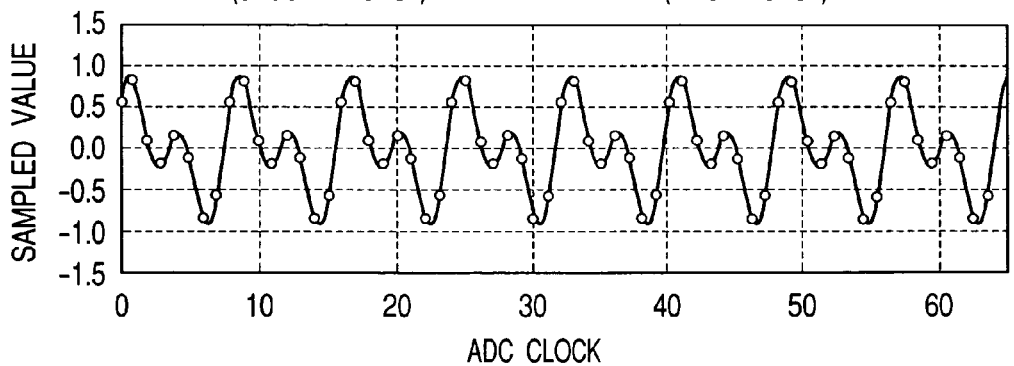
Figure 16C:
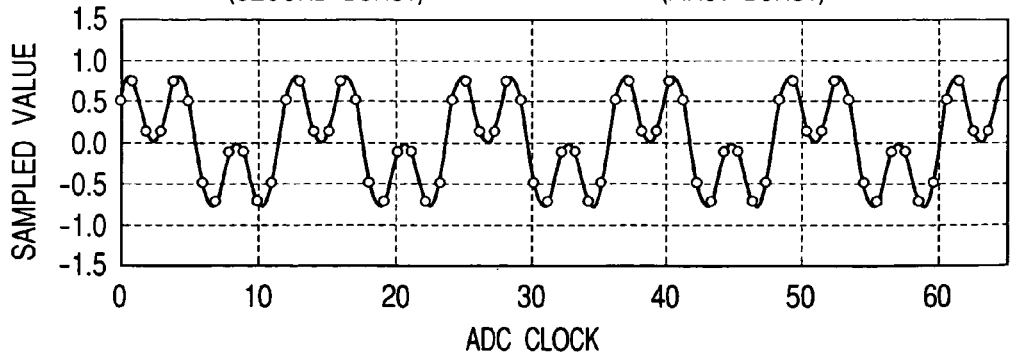

FIG. 16A shows a read waveform of A-burst that is read at the position of the read element shown in FIG. 15. The read waveform that is formed by adding the fundamental component of the first burst-signal and the low frequency component of the second burst-signal is obtained. The burst detector of the servo decoder shown in FIG. 8 functions to separate the first burst-signal area and second burst-signal area. In detail, the read waveform generated from the A/D converter is subjected to Fourier transfer and the read waveform is separated easily. Though FIG. 16A shows the read waveform formed by setting a frequency of ⅔ the frequency of the first burst-signal area to the second burst-signal area, FIG. 16B shows the read waveform that uses ½ the frequency, and FIG. 16C shows the read waveform that uses ⅓ the frequency. Any one of these read waveforms is suitable for servo operation.

Figure 21:
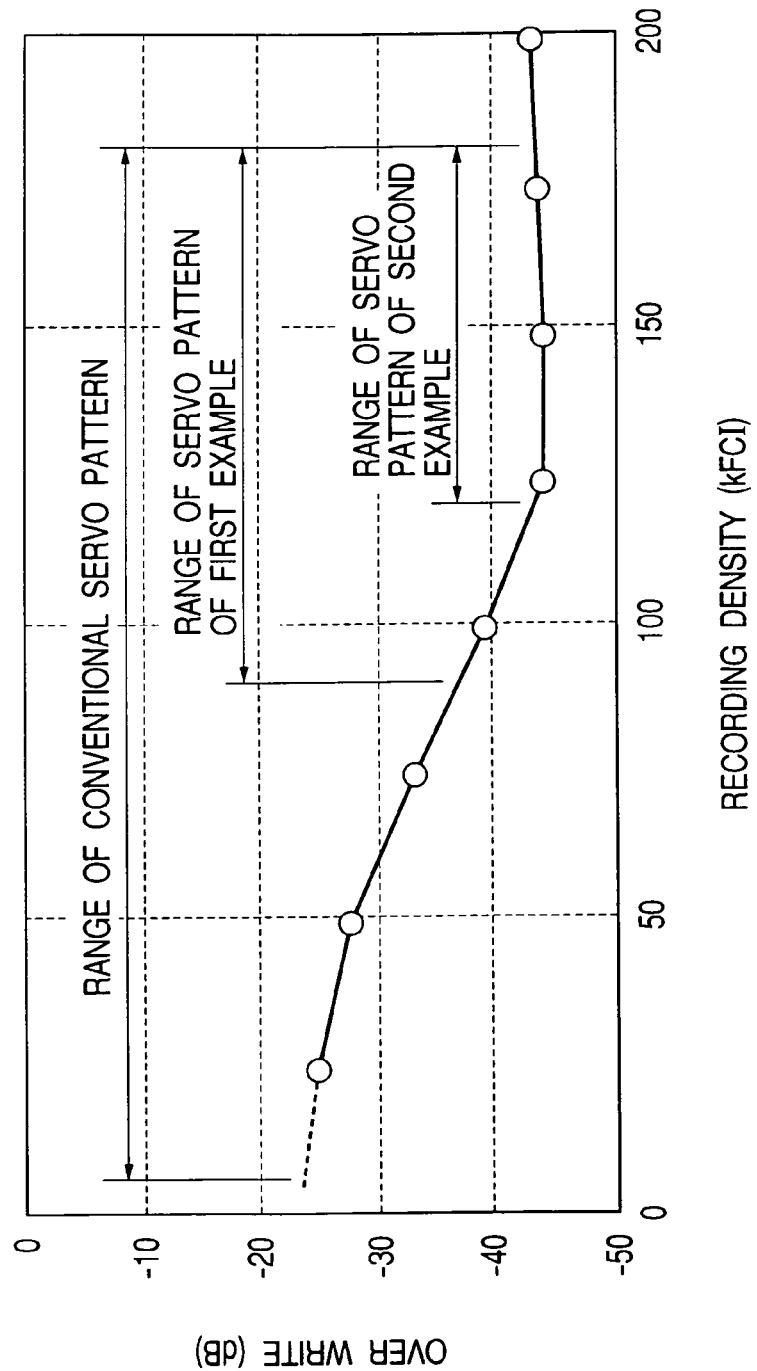
FIG. 21 is a diagram describing the relation between the recording density and overwrite performance.
Figure 22:
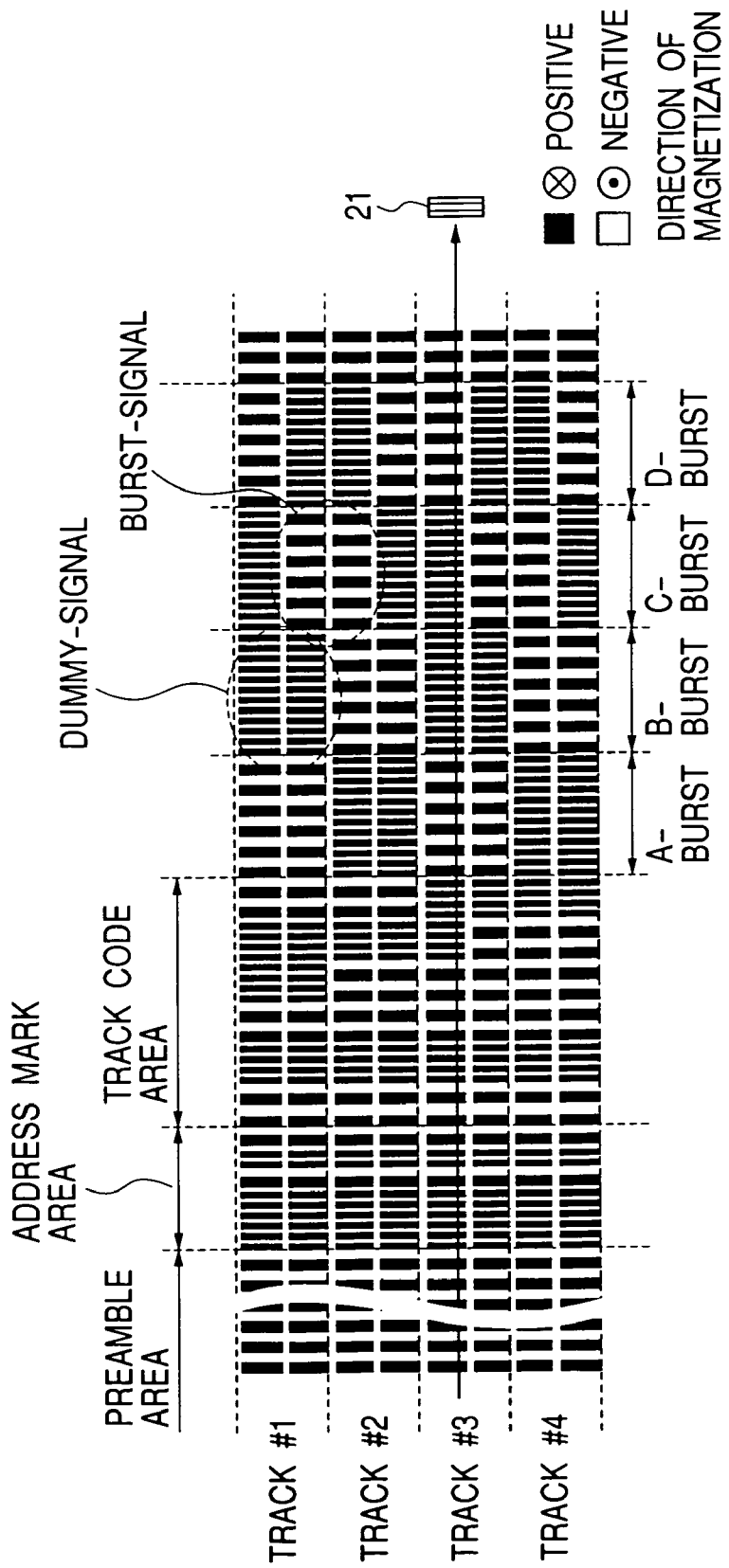
FIG. 22 is a diagram describing an exemplary servo pattern that uses high frequency dummy bit in a conventional magnetic disk apparatus.

By applying the above-mentioned structure, the servo pattern of the present embodiment is effective to increase the lowest frequency of burst area and to prevent deterioration of overwrite performance that is described in the section of "Description of Related Art". For example, the servo pattern described as "servo pattern of first example" shown in FIG. 21 is equivalent to the exemplary servo pattern in which ½ the frequency is set to the second burst-signal area. The conventional servo pattern cannot attain the overwrite performance of −30 dB with the lowest frequency included therein. On the other hand, the servo pattern of the present embodiment (servo pattern of first example) can attain the overwrite performance of −30 dB. Furthermore, the servo pattern described as "servo pattern of second example" shown in FIG. 21 is equivalent to the exemplary servo pattern in which ⅔ the frequency is set to the second burst-signal area, and can attain the overwrite performance of −40 dB or higher. Furthermore, the servo pattern of the present embodiment is advantageous in that S/N of the burst-signal is not deteriorated in comparison with the conventional technique in which double the frequency shown in FIG. 22 is set to the second burst-signal area. By applying the servo pattern of the present embodiment, the performance for writing servo pattern is improved and a magnetic disk apparatus with higher track density is realized.

Embodiment 6

Figure 17:
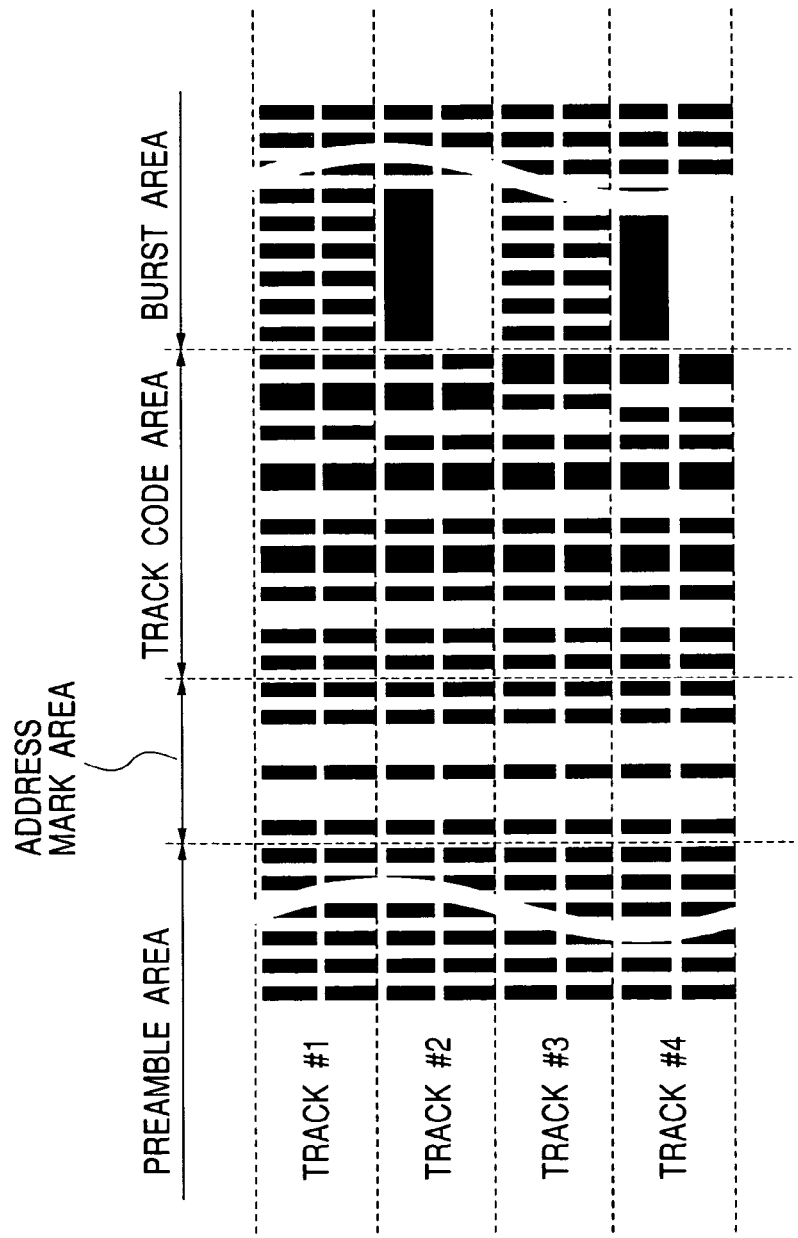
FIG. 17 is a diagram describing an exemplary servo pattern of the present invention having the track code area of di-phase code.

FIG. 17 is a schematic diagram showing another exemplary servo pattern in accordance with the present invention. Only address mark area and track code area are described in the present embodiment, and the pattern described in embodiment 1 to embodiment 5 is used for the burst area.

In the conventional servo pattern shown in FIG. 18, the data 1 of the track code area is encoded with the magnetization pattern of "+1, −1, +1, −1" and the data 0 is encoded with the magnetization pattern of "−1, −1, −1, −1". Herein +1 means positive direction of magnetization, and −1 means negative direction of magnetization. Therefore, the more the number of data 0 is, the more the sum of magnetization deviates to negative direction. In the case of the perpendicular magnetic recording system, the deviation of magnetization causes bias field of a magnetic head and brings about adverse effect. Furthermore, 0 comes straightly 10 times or more in a pattern depending on the track number, the recording density of some track of the conventional track code area is reduced to ¹⁄₁₀ or less of the recording density of the preamble area. In the case of perpendicular magnetic recording system, the lower the recording density is, the lower the amplitude becomes. As the result, S/N of the track code area of the conventional servo pattern is apt to deteriorate with the elapsed time. The system described hereinabove is called as di-bit encoding system and employed popularly for products of in-plane recording system. Furthermore, though a system in which the data 1 of the track code area is encoded with the magnetization pattern of "+1, −1" and the data 0 is encoded with the magnetization pattern of "−1, −1" is employed, this system is also disadvantageous in that the sum of magnetization deviates to one direction when it is combined with the perpendicular magnetic recording system as in the case of di-bit encoding system.

On the other hand, the data 1 and the data 0 of the address mark area and track code area of the servo pattern of the present embodiment are encoded with magnetization pattern of "+1, −1" and "−1, +1" respectively. This system is called as phase shift encoding system. In this system, the sum of magnetization is always equalized to 0 regardless of the number of data 0, and one DC-signal area comprises DC-signals of positive and negative direction of magnetization that have the same area in the exemplary servo pattern shown in the figure, and as the result the sum of magnetization of the DC-signal area is almost 0.

Figure 23:
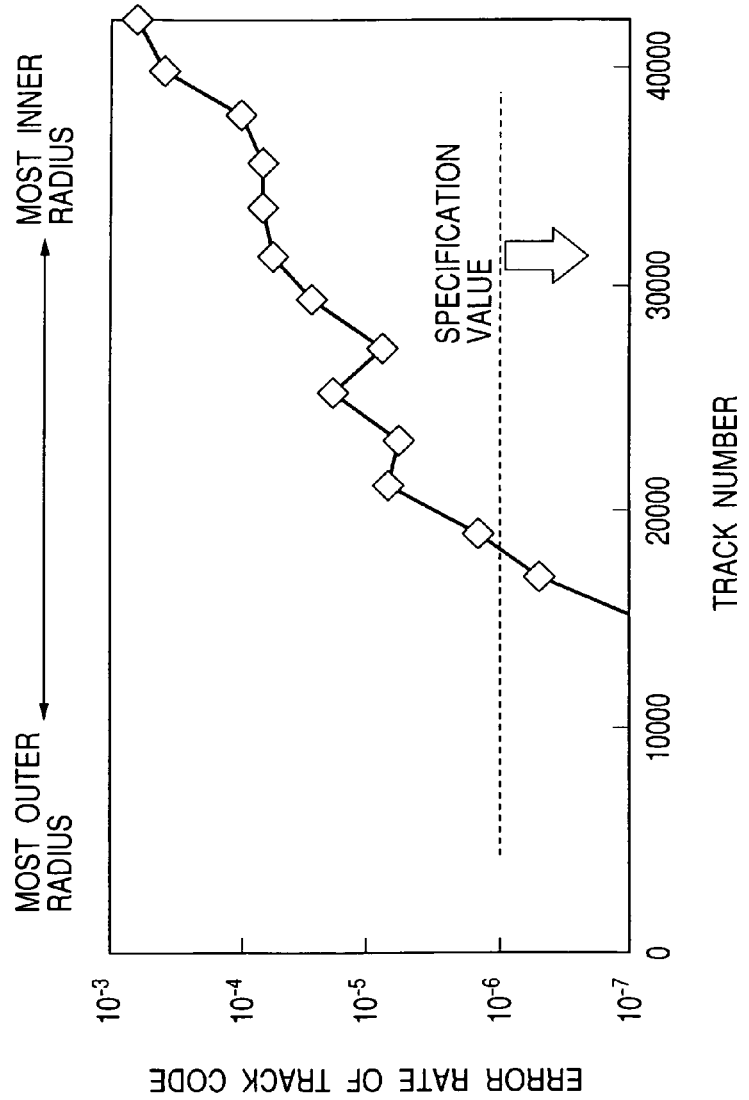
FIG. 23 is a diagram describing the track code error that occurs when the servo pattern having the high frequency dummy bit is used.

The servo pattern of the present embodiment does not generate bias filed and prevents deterioration of write and read performance. Furthermore, by applying this encoding system, the recording density of the track code can be limited within a range from the recording density that is same as that of the preamble area to ½ the recording density. This recording density is equivalent to "servo pattern of second example" and the servo pattern is effective to improve the problem of amplitude reduction in comparison with the conventional servo pattern. Furthermore, the recording density range is equivalent to "servo pattern of first example" shown in FIG. 21, and this servo pattern is more effective than the conventional servo pattern to significantly improve the overwrite performance. Furthermore, the recording density of the track code of the servo pattern shown in FIG. 22 in which high recording density is employed for dummy bit ranges from the recording density that is the same as that of the preamble area to the double the recording density, and this recording density range is significantly different from that of the present embodiment. As the result, the problem of detection error of the track code shown in FIG. 23 is prevented.

FIG. 5 shows another exemplary servo pattern of the present embodiment. The structure of only the address mark area and track code area is described, and the structure of the burst area is by no means limited to that shown in FIG. 5 and any one of structures shown in embodiment 1 to embodiment 5 may be employed. The address mark area and track code area of the present embodiment is encoded by combining the above-mentioned phase shift encoding and XOR arithmetic. For example, 10 bit data string of "1110101000" is converted to "10101001100110010101" by means of phase shift encoding, and further converted to "11111010101010111110" (on the assumption that the following bit is 1) by means of XOR arithmetic to thereby form the magnetization pattern on the magnetic disk of "+1, −1, +1, −1, +1, −1, −1, +1, +1, −1, 31 1, +1, +1, −1, −1, +1, −1, +1, −1, +1". This encoding system is called as di-phase encoding system.

Figure 20:
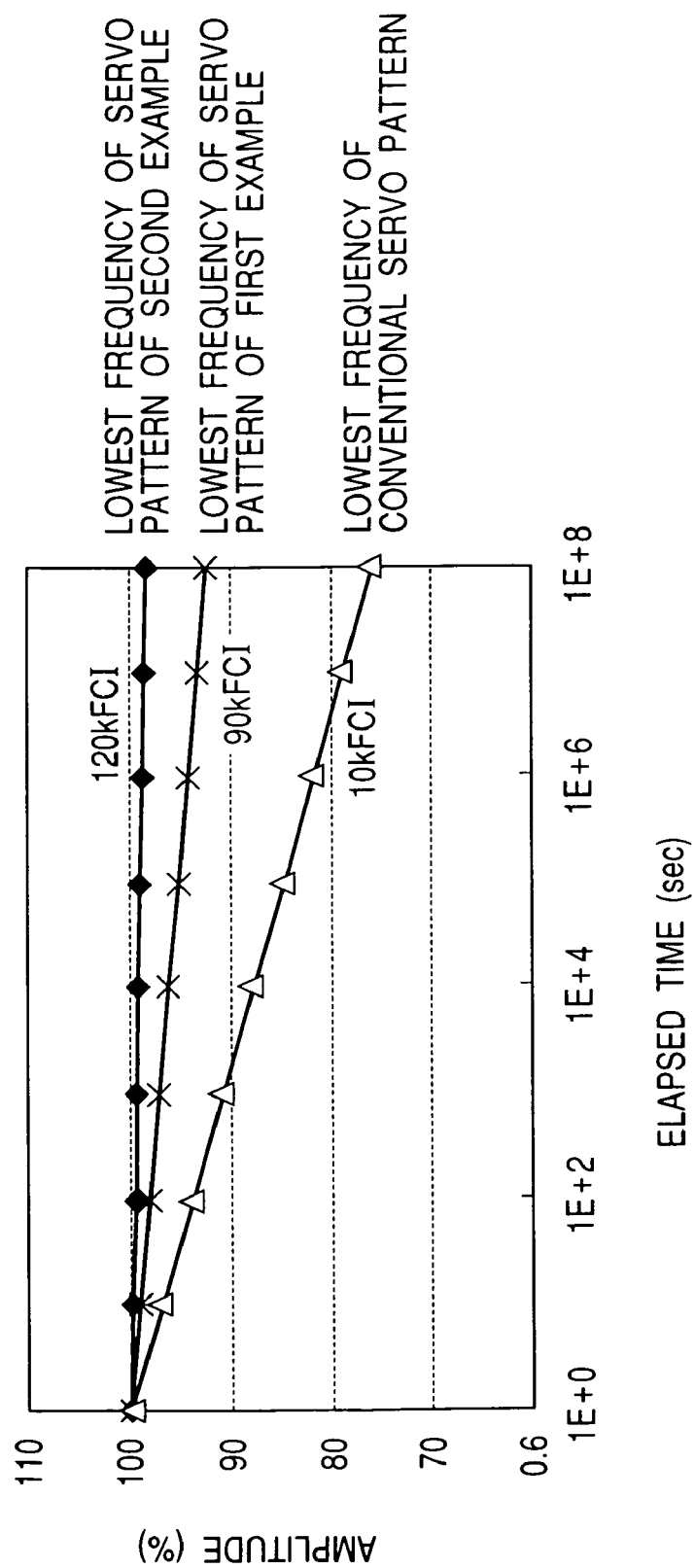
FIG. 20 is a diagram describing the reduction of the amplitude with elapsed time at various recording density.

In this system, the sum of magnetization is 0 regardless of the number of data 0, and the performance deterioration in writing and reading due to bias field is prevented. Furthermore, by applying this encoding system, the recording density of the track code can be limited within a range from the recording density that is the same as that of the preamble area to ⅔ the recording density. This system is more effective than the phase shift system to improve the lowest frequency, and the problem of amplitude reduction is improved as shown by "servo pattern of second example" in FIG. 20. Furthermore, the overwrite performance of the servo pattern is improved as shown with "servo pattern of second example" in FIG. 21. As a matter of course, the problem of detection error of the track code shown in FIG. 23 is also prevented because the highest frequency is the same as the preamble frequency.

By applying the servo pattern formed by combining the address mark area and track code area of the present embodiment and the burst area described in embodiment 1 to embodiment 5, a reliable magnetic disk apparatus having large capacity is realized.

What is claimed is:
1. A magnetic disk apparatus comprising:
a perpendicular disk recording medium having a plurality of tracks disposed thereon concentrically or helically on a layer plane of said medium and having servo areas that cross the plurality of tracks radially on which a servo pattern for decoding a head position signal is disposed with magnetization information in a direction perpendicular to the layer plane;
a motor for rotationally driving the perpendicular magnetic disk recording medium;

a magnetic head on which a single magnetic pole type write element having a main pole and a return pole and a read element are mounted;

an actuator for controlling the position of the magnetic head on the perpendicular magnetic recording medium;

a servo decoder for receiving the read signal from the read element to generate the head position signal; and a servo circuit for receiving a signal from the servo decoder to supply a driving signal to the actuator, wherein the servo pattern includes a plurality of burst-signal areas on which magnetizations of a positive direction and magnetizations of a negative direction are perpendicular to the layer plane and disposed alternately in a down-track direction and a plurality of DC-signal areas disposed adjacent in a disk radius direction to the plurality of burst-signal areas, and each DC-signal area is formed of combination of a DC-signal of a positive magnetization direction and a DC-signal of a negative magnetization direction both of which are perpendicular to the layer plane, the burst-signal areas are disposed by a combination of positive and negative magnetizations so that the sum of the magnetizations of the burst-signal areas is almost 0, the DC-signal areas are disposed by a combination of positive and negative magnetizations so that the sum of the magnetizations of an area in a range equivalent to a width of the return pole of the single magnetic pole type write element is approximately 0, said each DC-signal area is formed by a combination of only one DC-signal of a positive magnetization direction and only one DC-signal of a negative magnetization direction, the DC-signal of positive magnetization direction and the DC-signal of negative magnetization direction have almost the same area, and the magnetization direction of the DC-signal adjacent to the inner side in a disk radius direction of the burst-signal area is opposite to the magnetization direction of the DC-signal adjacent to the outer side in the disk radius direction of the burst-signal area, and the sum of the magnetizations of the DC-signal areas corresponding to a width of the return pole of the single magnetic pole type write element is approximately 0, when a sum of magnetization of DC-signal areas is reversed in a disk radius direction at a period of half of the width of the return pole.

2. The perpendicular recording medium according to claim 1, wherein a DC-signal component of a read waveform of the DC-signal area is almost 0.

3. The magnetic disk apparatus according to claim 1, wherein a compensational signal for compensating magnetization adjacent to the DC-signal area in the down-track direction is provided, and the sum of magnetization of one DC-signal area including the magnetization of the compensational signal is almost 0.

* * * * *